(12) United States Patent
Washisu et al.

(10) Patent No.: US 7,465,107 B2
(45) Date of Patent: Dec. 16, 2008

(54) PHOTOGRAPHING APPARATUS AND CONTROL METHOD THEREFOR

(75) Inventors: Koichi Washisu, Tokyo (JP); Yasuo Suda, Yokohama (JP); Takayuki Tsuboi, Yokohama (JP)

(73) Assignee: Canon Kabushiki Kaisha (JP)

( * ) Notice: Subject to any disclaimer, the term of this patent is extended or adjusted under 35 U.S.C. 154(b) by 427 days.

(21) Appl. No.: 11/231,525

(22) Filed: Sep. 21, 2005

(65) Prior Publication Data
US 2006/0067672 A1 Mar. 30, 2006

(30) Foreign Application Priority Data

Sep. 21, 2004 (JP) ............................. 2004-273408
Feb. 9, 2005 (JP) ............................. 2005-033196

(51) Int. Cl.
*G03B 15/00* (2006.01)
*G03B 17/00* (2006.01)

(52) U.S. Cl. ...................................... 396/351; 396/439
(58) Field of Classification Search ................ 396/351, 396/439; 348/195, 202, 203; 359/210, 212, 359/223, 225
See application file for complete search history.

(56) References Cited

U.S. PATENT DOCUMENTS

| | | | |
|---|---|---|---|
| 4,623,930 A | 11/1986 | Oshima et al. | |
| 4,856,882 A | 8/1989 | Oshima et al. | |
| 5,020,890 A | 6/1991 | Oshima et al. | |
| 5,062,696 A | 11/1991 | Oshima et al. | |
| 6,130,993 A | 10/2000 | Hayakawa | |
| 2003/0162564 A1 | 8/2003 | Kimura et al. | |
| 2004/0183907 A1* | 9/2004 | Hovanky et al. | 348/151 |
| 2007/0177863 A1* | 8/2007 | Ishikawa et al. | 396/177 |

FOREIGN PATENT DOCUMENTS

| | | |
|---|---|---|
| EP | 0149365 A2 | 7/1985 |
| EP | 0427706 A2 | 5/1991 |
| JP | 60-143330 A | 7/1985 |
| JP | 5-14801 A | 1/1993 |
| JP | 7111613 A | 4/1995 |
| JP | 8-248318 A | 9/1996 |
| JP | 9023361 A | 1/1997 |
| JP | 11-275431 A | 10/1999 |
| JP | 2000-010139 A | 1/2000 |
| JP | 2000-75138 A | 3/2000 |
| JP | 2002171437 A | 6/2002 |
| JP | 2002-369046 A | 12/2002 |
| JP | 2003-219236 A | 7/2003 |
| JP | 2003309748 A | 10/2003 |
| JP | 2002-290810 A | 10/2004 |

* cited by examiner

*Primary Examiner*—Rodney E Fuller
(74) *Attorney, Agent, or Firm*—Rossi, Kimms & McDowell, LLP

(57) ABSTRACT

A photographing apparatus which realizes a taking lens barrel whose shape is not largely changed during panning or tilting shot, thereby being compact in size and easy to handle. In the photographing apparatus, an image pickup device (14*i*) outputs an electric signal from object light. A bending optical system (14) has a front lens (14*f*) and lens groups (14*j*, 14*k*, 14*l*, and 14*m*) and a mirror (14*c*) disposed between the front lens and the laminated lens 14*j*, to guide the object light to the image pickup device. A panning actuator (19) and a tilt actuator (15*f*) cause the mirror and the front lens or the lens groups to be pivotally moved in unison about respective different axes to thereby change a shooting direction.

22 Claims, 26 Drawing Sheets

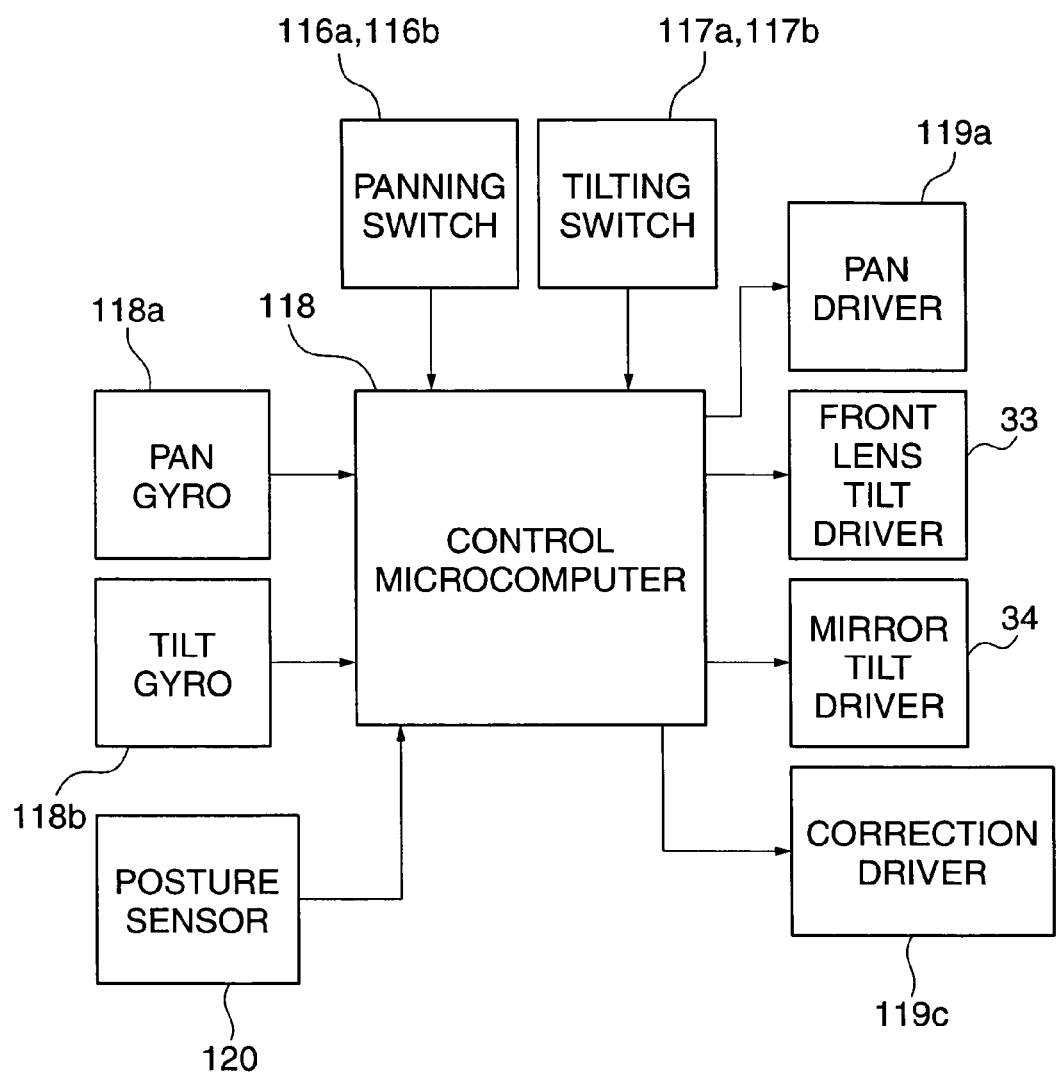

PHOTOGRAPHING APPARATUS AND CONTROL METHOD THEREFOR

CROSS REFERENCE TO RELATED APPLICATION

This application claims priority from Japanese Patent Applications Nos. 2004-273408 filed Sep. 21, 2004, and 2005-033196 filed Feb. 9, 2005, respectively, which are hereby incorporated by reference herein.

BACKGROUND OF THE INVENTION

1. Field of the Invention

The present invention relates to a photographing apparatus, such as a video camera, and a control method therefor.

2. Description of the Related Art

Recently, in a video camera, operations, such as exposure determination, focusing, and shake correction, which are important for photographing, have been all automated, and hence even a photographer inexperienced in operating a camera seldom fails in photographing.

There has also been proposed a video camera designed such that natural images can be obtained even when photographing is carried out while moving the camera intentionally during photographing, for example, performing a panning operation (an operation of horizontally moving the shooting direction of the camera) and/or a tilting operation (an operation of vertically moving the shooting direction of the camera) (see e.g. Japanese Laid-Open Patent Publication (Kokai) No. H11-275431).

However, the operation for carrying out panning during photographing is not fully automated, and a large part of the operation depends on a photographer's skill. When panning is manually performed, the velocity of panning cannot be held constant, and degradation of image quality can occur due to a camera shake, which makes it difficult for a beginner to perform stable and high-quality video recording.

As a technique of correcting a camera shake occurring during a manual panning operation, there has been proposed a shake correction device e.g. in Japanese Laid-Open Patent Publication (Kokai) No. H05-014801, in which a correction mirror that tilts at an angular velocity proportional to the angular velocity of a video camera is incorporated in the video camera, and the optical axis of object light having entered a taking lens is finely adjusted using the correction mirror.

However, according to this technique, the panning operation of the video camera is manually performed by the photographer, and to enhance the stability of the panning operation, the shake correction is performed during the manual panning operation by finely adjusting the optical axis of object light having entered the taking lens, horizontally and vertically, in proportion to the angular velocity of the video camera. This technique, which is used solely for fine adjustment, is not at all configured to bend the optical axis at a large angle of several tens of degrees. Therefore, the technique is not suitable for a panning operation performed over a large angle so as to follow the motion of an object.

Further, as a technique of assisting the manual panning operation, a method is known, for example, in which when the photographer is performing a panning operation, a taking lens barrel is drivingly controlled so as to perform shake correction based on an output from an angular velocity sensor that detects a panning angular velocity, as well.

In this method, the panning operation of the video camera is performed by the photographer, and to enhance the stability of the panning operation, the taking lens barrel is slightly driven for the panning correction. However, since the amount of drive correction of the taking lens barrel is mechanically limited, it is difficult for this method to fully cope with panning operations which are performed at various velocities and in various amounts of panning. Further, this method requires getting experienced in operation of the video camera, and hence it cannot sufficiently serve as a method for a system that can be immediately used by a beginner.

To achieve stable video recording irrespective of the velocity and amount of panning, it can be envisaged as a suitable method to automatically pivotally move a taking lens barrel itself in accordance with a panning direction. However, a photographing apparatus employing this method has not yet been realized. Broadly speaking, as the photographing apparatus employing this method, there has been proposed an apparatus for use as a surveillance camera or the like, in which panning and tilting are performed with a camera body provided with a taking lens barrel placed on a rotary pan head or a table (see e.g. Japanese Laid-Open Patent Publication (Kokai) No. 2002-369046).

However, the apparatus that performs panning and tilting with its camera body placed on the rotary pan head or the table is originally designed on the assumption that it will be installed on a table or a wall, and hence has no portability enabling the user to carry the apparatus. In addition, a large hemispherical space is required around the camera body so as to allow horizontal and vertical rotation of the camera body, which makes it difficult to achieve an excellent operability and a compact construction.

Further, if the apparatus that performs panning and tilting with its camera body placed on the rotary pan head or the table is applied to a consumer video camera, the following problem will arise.

FIGS. 25A to 25C are views showing, by way of example, the construction of a conventional consumer video camera provided with a rotary pan head as a panning mechanism, in which FIG. 25A is a front view, FIG. 25B a side view, and FIG. 25C a top plan view.

A video camera body 511 is provided with a taking lens barrel 512 and a viewfinder 513. Solid lines 512d in FIG. 25B indicate a boundary between the video camera body 511 and the taking lens barrel 512. The taking lens barrel 512 can be pivotally moved about a shaft 512a (512g) by an actuator 512e (512f) in a direction 512b (512h) for panning (tilting) photographing.

Two-dot chain lines 512i in FIG. 25C indicate a state where the taking lens barrel 512 is panned 60 degrees. As is apparent from FIG. 25C, during panning, the taking lens barrel 512 largely projects from the video camera body 511 to form an odd shape. This not only makes it hard for the user to hold the video camera in a hand for photographing, but also largely shifts the center of gravity of the taking lens barrel 512, which makes the shooting operation unstable. Further, there is a fear that dust or dirt enters the video camera body 511 and the taking lens barrel 512 through the vicinity of the boundary 512d.

For the above described reason, if the conventional shape of the taking lens barrel remains unchanged, it is difficult to realize a video camera easy to operate in performing panning and tilting as desired.

SUMMARY OF THE INVENTION

It is a first object of the present invention to provide a photographing apparatus which realizes a taking lens barrel whose shape is not largely changed during panning or tilting shot, thereby being compact in size and easy to handle, and a control method therefor.

It is a second object of the present invention to provide a photographing apparatus which is compact in size, excellent in portability and easily applicable to various shooting modes and hence excellent in user friendliness, and a control method therefor.

To attain the above first and second objects, in a first aspect of the present invention, there is provided a photographing apparatus comprising an image pickup device that outputs an electric signal in response to object light, a photographic optical system that has a plurality of lenses, and a reflective surface disposed therebetween, and guides the object light to the image pickup device, and a shooting direction-changing device that causes the reflective surface and a predetermined lens or a predetermined lens group of the lenses to be pivotally moved in unison about respective different axes to thereby change a shooting direction.

Preferably, the shooting direction-changing device causes the reflective surface and the predetermined lens or the predetermined lens group of the lenses to be pivotally moved in unison about the respective different axes at a predetermined ratio therebetween.

Preferably, the photographing apparatus comprises an illuminating device that illuminates an object in a direction from which the object light enters the photographic optical system.

Preferably, the reflective surface is a mirror.

Preferably, the shooting direction-changing device comprises a lens driving device that is provided in association with the predetermined lens or the predetermined lens group, for pivotally moving the predetermined lens or the predetermined lens group, a reflective surface-driving device that is provided in association with the reflective surface, for pivotally moving the reflective surface, and a drive control device that drivingly controls the lens driving device and the reflective surface-driving device to be pivotally moved in unison.

Preferably, the predetermined lens or the predetermined lens group is pivotally disposed on a side of the reflective surface closer to an object, and the shooting direction-changing device causes the predetermined lens or the predetermined lens group to be pivotally moved by an amount twice as large as an amount of pivotal movement of the reflective surface.

More preferably, the predetermined lens or the predetermined lens group is pivotally disposed on a side of the reflective surface closer to an object, and the drive control device drivingly controls the lens driving device and the reflective surface-driving device in a manner such that the predetermined lens or the predetermined lens group is pivotally moved by an amount twice as large as an amount of pivotal movement of the reflective surface.

Preferably, the shooting direction-changing device reduces a rotational speed of pivotal movement of one of the reflective surface and the predetermined lens or the predetermined lens group, the one moving in a larger amount than another of the reflective surface and the predetermined lens or the predetermined lens group, to thereby cause the pivotal movement reduced in the rotational speed to be transmitted to the other of the reflective surface and the predetermined lens or the predetermined lens group.

To attain the above first and second objects, in a second aspect of the present invention, there is provided a photographing apparatus comprising a first scanning device that scans a photographic optical system in a first direction on a plane orthogonal to a photographic optical axis of the photographic optical system, a second scanning device that scans the photographic optical system in a second direction different from the first direction, a posture detecting device that detects a posture of the photographic optical system about the photographic optical axis thereof, and a drive control device that causes the first and second scanning devices to cooperatively operate based on a posture detecting signal from the posture detecting device.

Preferably, the photographic optical system has an image pickup surface, and the photographing apparatus further comprises a third scanning device that pivotally moves the image pickup surface of the photographic optical system about the photographic optical axis, the drive control device causing the first, second, and third scanning devices to cooperatively operate based on a posture detecting signal from the posture detecting device.

To attain the above first and second objects, in a third aspect of the present invention, there is provided a photographing apparatus comprising an optical system, a locus recording device that records locus information indicative of a locus of a shooting direction, a shooting direction-changing device that scans the optical system to change the shooting direction, and a shooting direction-returning device that drivingly controls the shooting direction-changing device based on the locus information recorded in the locus recording device, to thereby return the shooting direction to an initial position thereof.

Preferably, the photographing apparatus further comprises an information reset device that resets the locus information recorded in the locus recording device, when the shooting direction is returned to the initial position thereof.

To attain the above first and second objects, in a fourth aspect of the present invention, there is provided a photographing apparatus comprising an optical system comprising a main optical section that is formed by a plurality of lenses arranged along a photographic optical axis, and is pivotally movable about the photographic optical axis, a bending optical section that has a reflective surface for bending the photographic optical axis and is pivotally movable about the photographic optical axis, and an image pickup section that forms an image from an optical flux from the main optical section and is pivotally movable about the photographic optical axis, a first turning device that pivotally moves the main optical section and the bending optical section in unison about the photographic optical axis, a second turning device that pivotally moves the image pickup section about the photographic optical axis, and a drive control device that drivingly controls the first and second turning devices in an interlocked manner.

To attain the above first and second objects, in a fifth aspect of the present invention, there is provided a photographing apparatus comprising an optical system comprising a main optical section that is formed by a plurality of lenses arranged along a photographic optical axis, a bending optical section that has a reflective surface for bending the photographic optical axis, and an image pickup section that forms an image from an optical flux from the main optical section, the main optical section and the bending optical section being pivotally movable relative to each other about the photographic optical axis, and the image pickup section being pivotally movable about the photographic optical axis, an optical section-turning device that pivotally moves the bending optical section relative to the main optical section about the photographic optical axis, an image pickup section-turning device that pivotally moves the image pickup section about the photographic optical axis, and a drive control device that drivingly controls the optical section-turning device and the image pickup section in an interlocked manner.

To attain the above first and second objects, in a sixth aspect of the present invention, there is provided a photographing apparatus comprising a lens barrel that is pivotally movable about a first rotational axis and has a bending optical system for bending a photographic optical axis, wherein an optical flux having entered the lens barrel through the bending optical system forms an image, a support member that rotatably supports at least a part of the lens barrel, the support member cooperating with the lens barrel to form a lens barrel unit that is pivotally movable about a second rotational axis perpendicular to the first rotational axis, a first turning device that rotates the lens barrel about the first rotational axis, and a second turning device that rotates the lens barrel unit about the second rotational axis.

Preferably, the photographing apparatus comprises an illuminating device that illuminates an object in a direction from which object light enters the lens barrel.

Preferably, the photographing apparatus comprises a photographing apparatus body that is rotatable relative to the lens barrel unit about the second rotational axis, and a display device that displays an area that can be shot, and the photographing apparatus body has one surface that tilts in accordance with the relative rotation of the photographing apparatus body, and said display device is provided on the one surface.

Preferably, the photographing apparatus comprises a receiving device that receives an external command, and an optical axis direction-changing device that drivingly controls one or both of the first and second turning devices, according to the command received by the receiving device, to thereby change a direction of the photographic optical axis.

Preferably, the photographing apparatus comprises a photographing apparatus body that is rotatable relative to the lens barrel unit about the second rotational axis, and having one end face, the lens barrel unit being mounted on the one end face of the photographing apparatus body, the photographing apparatus being changeable in a mode of use thereof, and the mode of use can be changed at least between a first use mode in which the lens barrel unit is disposed along the one end face of the photographing apparatus body, with an axis of the lens barrel unit vertically directed, and a second use mode in which the lens barrel unit is disposed orthogonally to the one end face of the photographing optical body, with the axis of the lens barrel unit vertically directed.

To attain the above first and second objects, in a seventh aspect of the present invention, there is provided a method of controlling a photographing apparatus including a photographic optical system having a plurality of lenses, and a reflective surface disposed therebetween, comprising a shooting direction-changing step of causing the reflective surface and a predetermined lens or a predetermined lens group of the lenses to be pivotally moved in unison to thereby change a shooting direction.

To attain the above first and second objects, in an eighth aspect of the present invention, there is provided a method of controlling a photographing apparatus including a first scanning device that scans a photographic optical system in a first direction on a plane orthogonal to a photographic optical axis of the photographic optical system, a second scanning device that scans the photographic optical system in a second direction different from the first direction, and a posture detecting device that detects a posture of the photographic optical system about the photographic optical axis, comprising a drive control step of causing the first and second scanning devices to cooperatively operate based on a posture detecting signal from the posture detecting device.

To attain the above first and second objects, in a ninth aspect of the present invention, there is provided a method of controlling a photographing apparatus including a locus recording device that records locus information indicative of a locus of a shooting direction, and a shooting direction-changing device that scans the optical system to change the shooting direction, comprising a shooting direction-returning step of drivingly controlling the shooting direction-changing device based on the locus information recorded in the locus recording device, to thereby return the shooting direction to an initial position thereof.

To attain the above first and second objects, in a tenth aspect of the present invention, there is provided a method of controlling a photographing apparatus having an optical system comprising a main optical section that is formed by a plurality of lenses arranged along a photographic optical axis, and is pivotally movable about the photographic optical axis, a bending optical section that has a reflective surface for bending the photographic optical axis and is pivotally movable about the photographic optical axis, and an image pickup section that forms an image from an optical flux from the main optical section and is pivotally movable about the photographic optical axis, comprising a drive control step of drivingly controlling a first turning device that pivotally moves the main optical section and the bending optical section in unison about the photographic optical axis and a second turning device that pivotally moves the image pickup section about the photographic optical axis, in an interlocked manner.

According to the present invention, it is possible to enhance stability in panning and tilting shot, as well as to realize downsizing of a photographing apparatus. Further, the present invention makes it possible to realize a photographing apparatus which is easily applicable to various photographing modes and hence excellent in user friendliness.

The above and other objects, features, and advantages of the present invention will become more apparent from the following detailed description taken in conjunction with the following drawings.

BRIEF DESCRIPTION OF THE DRAWINGS

FIG. 19 is a block diagram showing the electrical system configuration of the photographing apparatus according to the third embodiment;

DETAILED DESCRIPTION OF THE PREFERRED EMBODIMENTS

The present invention will now be described in detail below with reference to the drawings showing preferred embodiments thereof.

Figure 1:
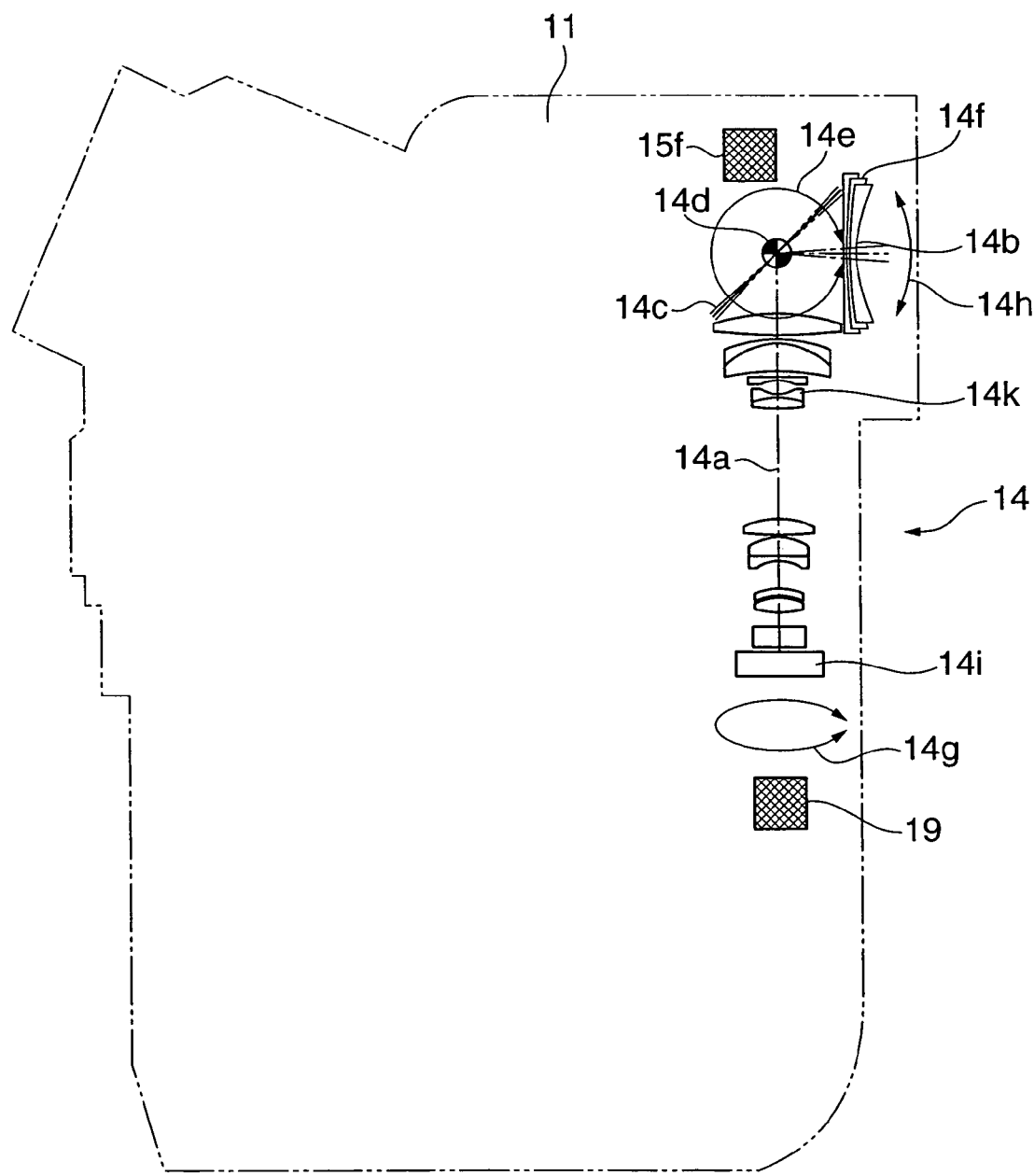
FIG. 1 is a schematic view showing the whole construction of a video camera as a photographing apparatus according to a first embodiment of the present invention.

FIG. 1 is a schematic view showing the whole construction of a video camera as a photographing apparatus according to the first embodiment of the present invention.

As shown in FIG. 1, a video camera body 11 is provided with a bending optical system 14 accommodated therein. In the video camera body 11, a main optical axis 14a of the bending optical system 14 extends in a vertical direction (along an axis approximately orthogonal to the horizontal plane on which the video camera is placed), bends (i.e. the direction of the main optical axis changes) at a mirror (reflection surface) 14c, and further extends from the mirror 14c toward an object. An angle formed by the main optical axis 14a and an object optical axis 14b (a part of the main optical axis 14a closer to the object with respect to the mirror 14c) changes according to the rotational position of the mirror 14c. When the mirror 14c is in its initial position, the angle formed by the two optical axes is 90 degrees. Object light having entered the bending optical system 14 and reached the mirror 14c is reflected by the mirror 14c to form an image on an image pickup device 14i, such as a CCD.

Panning is performed by causing a panning actuator 19 to pivotally move the whole bending optical system 14 about the main optical axis 14a. The bending optical system 14 is thus pivotally moved for panning. Since the component members of the bending optical system 14 including lenses, that are pivotally moved, each have a circular shape, an increase in panning angle causes only an increase in the rotational angle of the bending optical system 14 about the main optical axis 14a, and the shape of the bending optical system 14 does not change in relation to the video camera body 11. In other words, a taking lens barrel (designated by reference numeral 18 in FIG. 6) incorporating the bending optical system 14 never protrudes from the video camera body 11.

Tilting is performed by causing a tilt actuator 15f to pivotally move the mirror 14c and an objective lens (front lens) 14f about a shaft 14d.

It is a general practice to change the reflection angle of a reflection surface to change the direction of an optical axis. In the present invention, however, not only the angle (reflection angle) of the mirror 14c as the reflection surface is changed, but also the front lens 14f is pivotally moved in accordance with the pivotal movement of the mirror 14c. This operation will be described in detail below.

Figure 2:
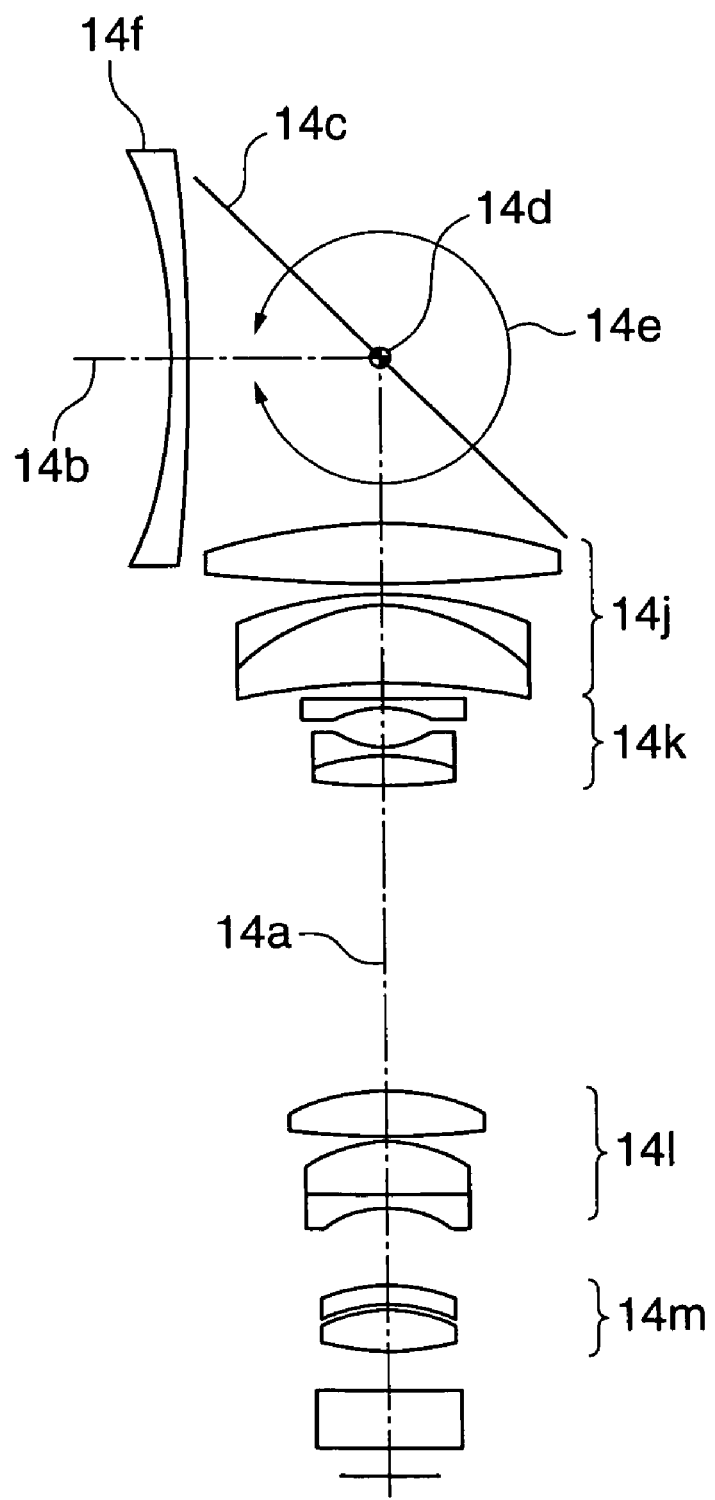
FIG. 2 is a view showing the construction of a bending optical system appearing in FIG. 1.

FIG. 2 is a view showing the construction of the bending optical system 14 shown in FIG. 1.

The bending optical system 14 forms a high magnification zoom optical system comprised of four groups in all. A first-group is comprised of the front lens 14f, the mirror 14c, and a laminated lens group 14j. The bending optical system 14 is comprised of the first-group, a second-group 14k that moves along the main optical axis 14a for magnification/reduction, a constantly fixed third-group 14l, and a fourth-group 14m that moves along the main optical axis 14a for focus adjustment.

The object optical axis 14b is tilted by pivotally moving the mirror 14c and the front lens 14f about the shaft 14d in directions indicated by a double-headed arrow 14e as shown in FIG. 1.

The reason why the front lens 14f is provided at the side of the mirror 14c closer to the object is that the size of the mirror can be reduced by reducing the inclination angle of a principal ray from the object at the front lens 14f and guiding the object light to the mirror 14c.

In the present embodiment, which is configured such that tilting is performed by pivotally moving the mirror 14c, if the mirror 14c is configured to fully cover the whole angle of view for shooting with tilting (e.g. 10 degrees as viewed vertically), the mirror 14c has to have an increased size.

Therefore, it is very important to use a lens to reduce the inclination angle of the principal ray from the object and guide the object light to the mirror 14c.

In the case where the front lens 14f is provided at the object side of the mirror 14c as mentioned above, the object optical axis 14b deviates from the center of the front lens 14f as the mirror 14c is pivotally moved, which results in significant degradation of image quality. To solve this problem, the mirror 14c is driven such that the center of the front lens 14f follows the shift of the object optical axis 14b caused by the pivotal movement of the mirror 14c.

If the mirror 14c pivotally moves through θ degrees, the object optical axis 14b changes in angle by 2θ degrees accordingly (because the change occurs in a reflection system). Therefore, the front lens 14f is pivotally moved through 2θ degrees about the pivot of the mirror 14c to correct the angle of the object optical axis 14b, thereby preventing degradation of image quality.

Conventionally, bending optical systems having a lens disposed on the object side of a reflection surface have been proposed e.g. in Japanese Laid-Open Patent Publications (Kokai) Nos. H08-248318, 2000-074138, and 2003-219236. However, in the optical systems described in these documents, tilting in the shooting direction is not intended, and hence, none of the documents disclose a configuration in which the reflection surface is pivotally moved, and the front lens is also pivotally moved in accordance with the motion of the reflection surface, as in the present embodiment. Further, in these documents, the whole reflection surface is formed by a prism. This is because the use of an optical block, such as a prism, makes it possible to reduce the optical path, making the system compact in size.

However, in the case where the reflection surface is pivotally moved as in the present embodiment, it is difficult to optically manage image quality without using the mirror 14c. In other words, the use of a prism makes it very difficult to achieve optical management of image quality. This will be described with reference to FIG. 3.

Figure 3:
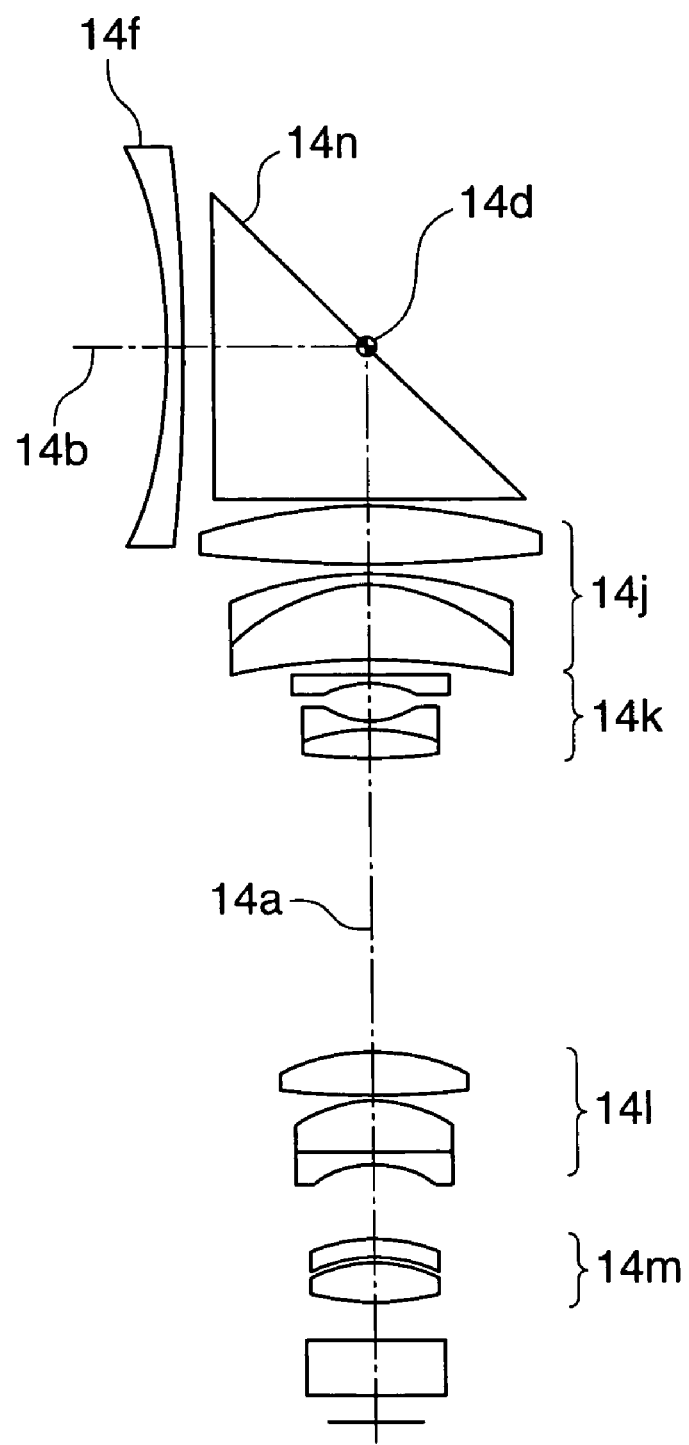
FIG. 3 is a view showing the construction of another example of the bending optical system.

FIG. 3 is a view showing the construction of another example of bending optical system in which a prism 14n is used in place of the mirror 14c of the bending optical system 14 in FIG. 2. As is apparent from FIG. 3, the shape relationship between mutually facing surfaces (opposed surfaces) of the laminated lens group 14j and the prism 14n and the shape relationship between opposed surfaces of the front lens 14f and the prism 14n would be changed if the prism 14n were pivotally moved about the shaft 14d. This means that the pivotal movement of the prism 14n would cause optical degradation.

Figure 4:
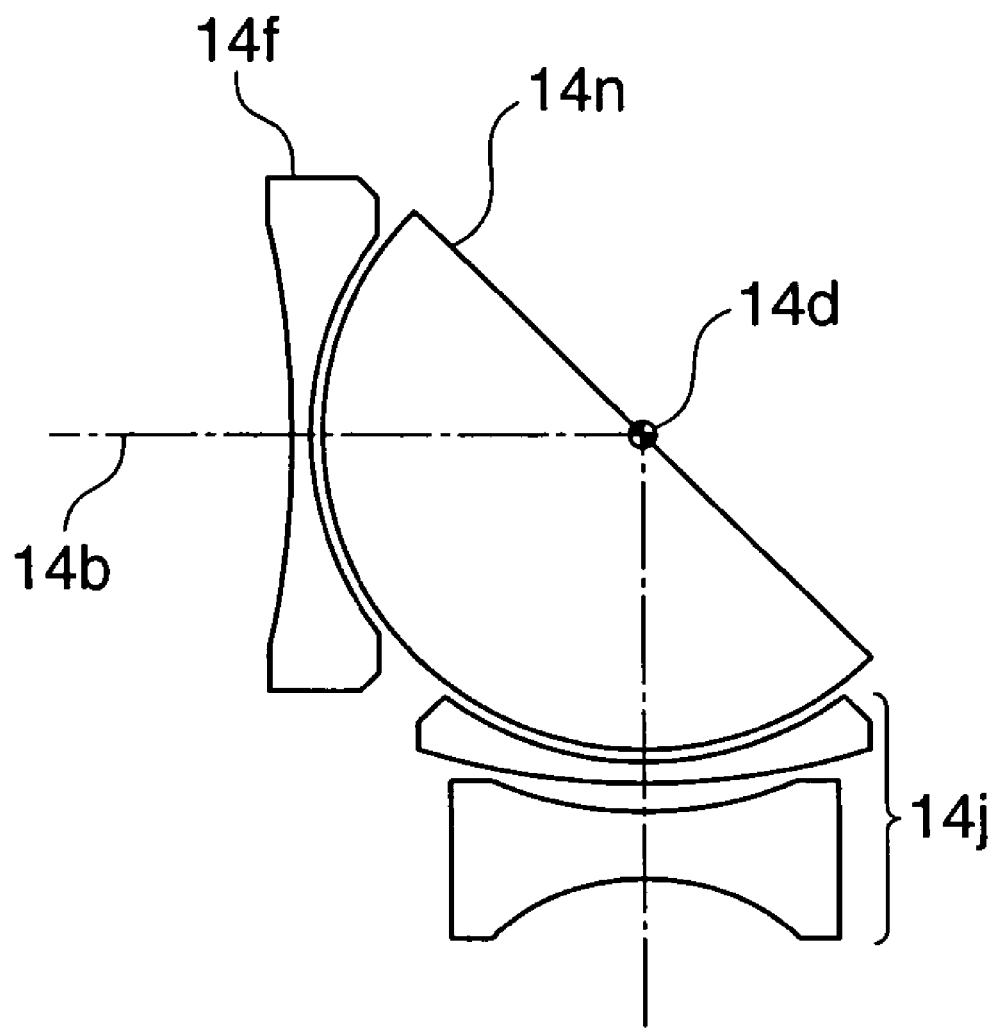
FIG. 4 is a view useful in explaining a method of solving a problem described with reference to FIG. 3.

FIG. 4 is a view useful in explaining a method of solving the problem described above with reference to FIG. 3. For example, if the opposed surfaces of the prism 14n and the front lens 14f and the opposed surfaces of the prism 14n and the laminated lens group 14n are each formed in a curvature surface with the shaft 14d as the central axis thereof as shown in FIG. 4, the shape relationship between each pair of the opposed surfaces does not change even when the prism (or semicylinder) 14n performs pivotal movement, and therefore the pivotal movement of the prism (or semicylinder) 14n does not cause degradation of image quality, either.

However, if such a curvature surface is provided, lenses or the like for correction are needed, which makes it difficult to form a small-sized optical high magnification zoom photographing system.

For this reason, the present embodiment employs not the prism 14n, but the mirror 14c for performing tilting.

Next, a description will be given of a tilting drive linkage.

Figure 5A:
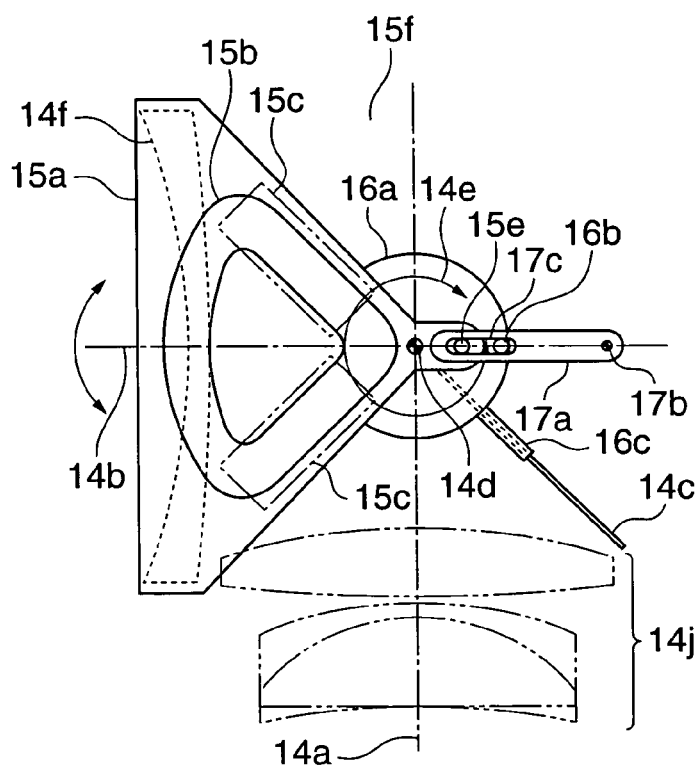
FIG. 5A is a side view showing a tilting drive linkage in the first embodiment.
Figure 5B:
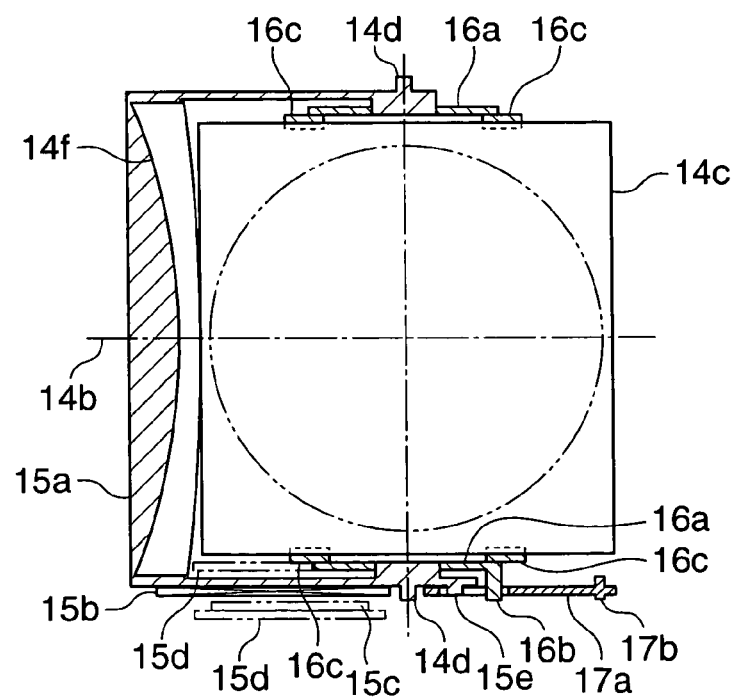
FIG. 5B is a top plan view of the tilting drive linkage.

FIGS. 5A and 5B are views showing the construction of the tilting drive linkage in the first embodiment. The tilting drive linkage is a mechanism that drives the mirror 14c and the front lens 14f. FIG. 5A is a side view of the mechanism, as viewed from the bending optical system in FIG. 2, and FIG. 5B is a top plan view of the same.

As shown in FIGS. 5A and 5B, a front lens support frame 15a that holds the front lens 14f is supported by the shaft 14d in a manner pivotally movable along with the front lens 14f about the shaft 14d in the directions indicated by the double-headed arrow 14e.

A flat coil 15b is fixed to one side of the front lens support frame 15a. A pair of permanent magnets 15c and a pair of yokes 15d forming respective magnetic paths for the pair of permanent magnets 15c are provided in facing relation to the flat coil 15b. The pair of magnets 15c and the pair of yokes 15d are attached to a fixed part which is fixed in place in the tilting directions 14e, but can pivotally move in panning directions 14g along with the bending optical system 14. Therefore, when the flat coil 15b is energized, the front lens support frame 15a is driven to perform pivotal movement in the tilting directions 14e. In short, the tilting actuator 15f is comprised of the flat coil 15b, the pair of magnets 15c, and the pair of yokes 15d.

The mirror 14c is attached to a fixture part 16c of a mirror support frame 16a. Similarly to the front lens support frame 15a, the mirror support frame 16a is supported by the shaft 14d in a manner rotatable along with the mirror 14c about the shaft 14d in the directions indicated by the arrow 14e.

A transmission lever (linkage) 17a is supported by a shaft 17b in a manner rotatable about the shaft 17b. The transmission lever 17a has a slot 17c formed therein in the vicinity of a front end thereof, and a driving pin 15e extending from the front lens support frame 15a and a driven pin 16b extending from the mirror support frame 16a are both fitted in the slot 17c.

As the transmission lever 17a is rotated about the shaft 17b in accordance with rotation of the driving pin 15e about the shaft 14d, the slot 17c pushes the driven pin 16b, whereby the mirror support frame 16a is also rotated about the shaft 14d.

If the ratio of the distance between the shaft 17b and the driving pin 15e and the distance between the shaft 17b and the driven pin 16b (hereinafter referred to as "the lever ratio"), and the ratio of the distance between the shaft 14d and the driving pin 15e and the distance between the shaft 14d and the driven pin 16b (hereinafter referred to as "the radius ratio") are properly set, for example, such that the lever ratio is $\sqrt{2}:1$, and
the radius ratio is $\sqrt{2}:1$, it is possible to reduce the rotational speed of the mirror support frame 16a to one half of the rotational speed of the front lens support frame 15a.

As mentioned hereinbefore, when the rotational angle of the mirror 14c is set to θ, the angle change of the object optical axis 14b due to the reflection is equal to 2θ. For this reason, it is necessary to pivotally move the front lens through the degree of 2θ to align the position of the front lens 14f with the object optical axis, so that the amount of rotation of the mirror 14c and that of the front lens 14f are adjusted using the lever ratio and the radius ratio.

Now, a description will be given of the reason why the drive source (flat coil 15b) is provided in the front lens support frame 15a having a larger rotation amount, and the rotational speed thereof is reduced to transmit the rotation to the mirror support frame 16a.

If position feedback control is performed e.g. using a position-detecting sensor, not shown, the drive source can be precisely driven and controlled, with high responsiveness. However, if the drive source is provided in the mirror support frame 16a having a smaller rotation amount, a driving error increases due to the small rotation amount of the mirror support frame 16a, and the error is amplified by the transmission lever 17a, resulting in an increased driven error of the front lens support frame 15a.

As will be described hereinafter, the mirror 14c and the front lens 14f are also provided with a function of detecting a camera shake by a shake detecting device, such as an angular velocity sensor, provided in the video camera body 11, and performing a driving operation based on an output from the shake detecting device, and this function serves to suppress degradation of image quality caused by a camera shake in the tilting directions.

To this end, it is necessary to drivingly control the front lens 14f and the mirror 14c with precision and high responsiveness. Therefore, the front lens support frame 15a having a larger driving amount (rotation amount) is driven, and the driving speed (rotational speed) is reduced to transmit the drive (rotation) to the mirror support frame 16a.

Next, a description will be given of a panning drive linkage.

Figure 6:
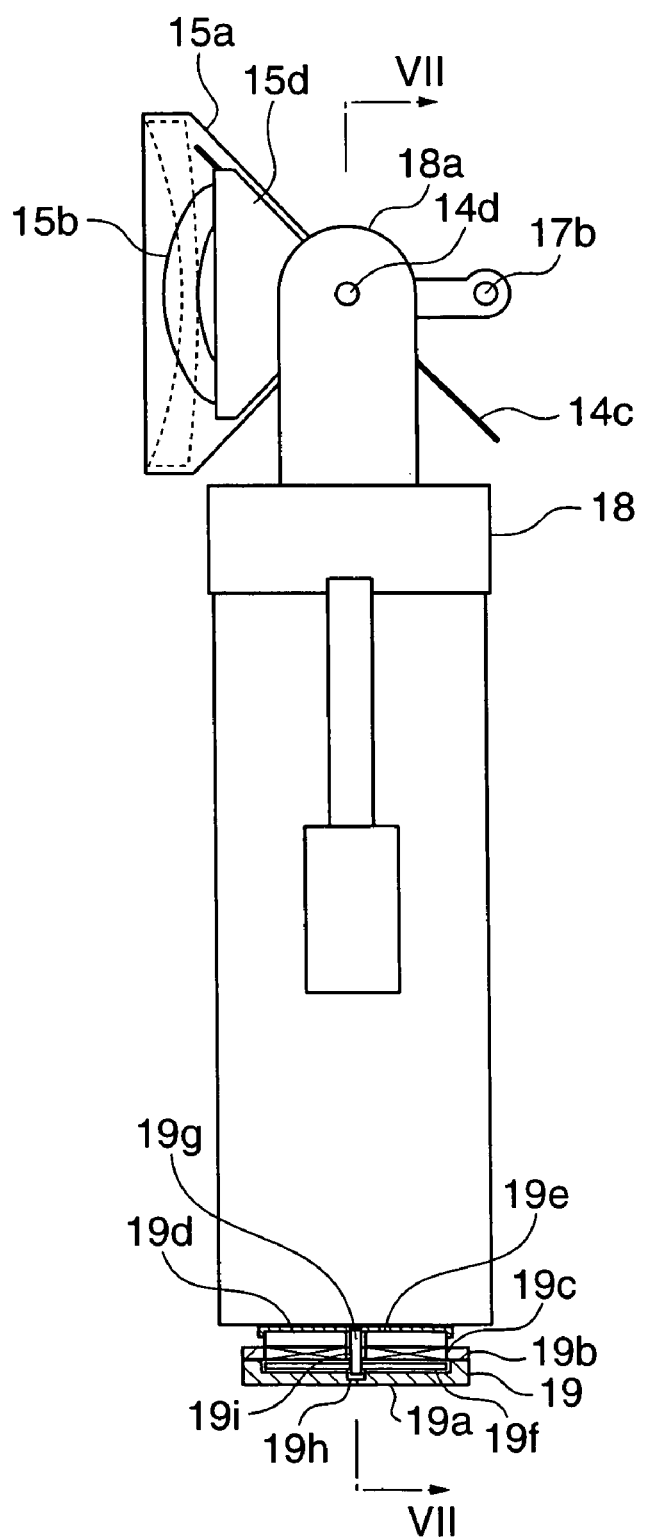
FIG. 6 is a side view showing a panning drive linkage.
Figure 7B:
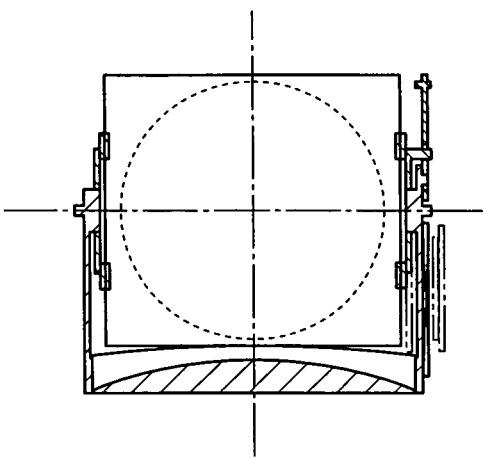
FIG. 7B is a top plan view of the panning drive linkage.
Figure 7A:
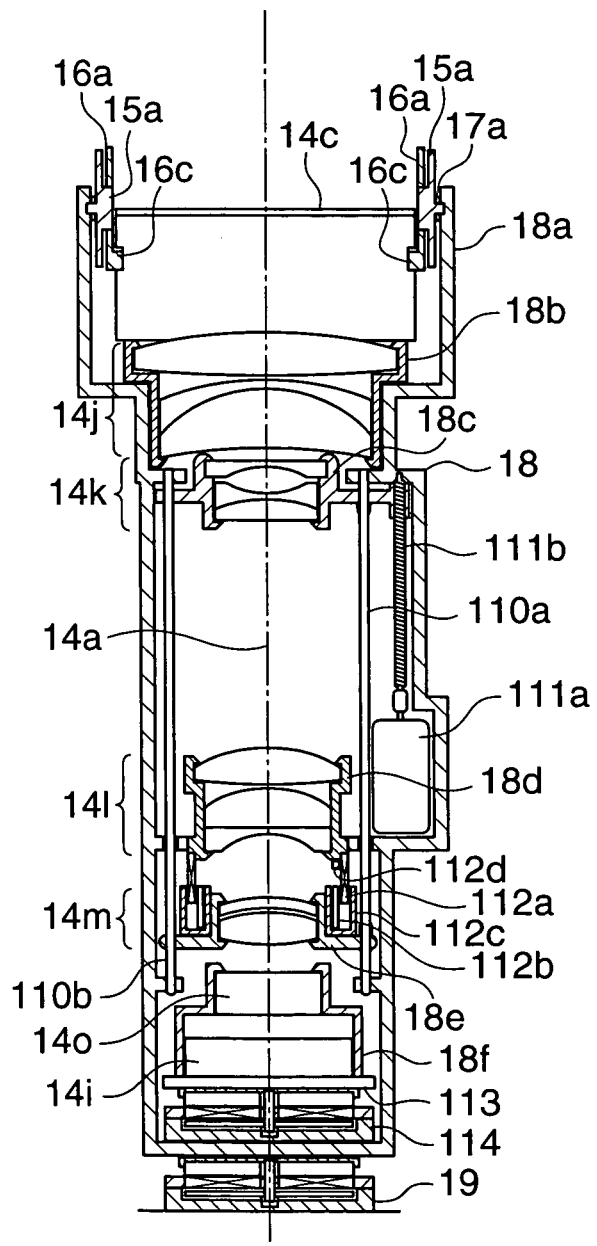
FIG. 7A is a cross-sectional view of the panning drive linkage, taken on line VII-VII in FIG. 6.

FIGS. 6, 7A, and 7B are views showing the construction of the panning drive linkage. The panning drive linkage is a mechanism that drives the lens barrel 18 accommodating the bending optical system 14. FIG. 6 is a side view showing the outside shape of the bending optical system 14 as viewed from the same direction as in FIG. 2. FIG. 7A is a cross-sectional view taken on line VII-VII in FIG. 6, and FIG. 7B is a top plan view of the panning drive linkage.

As is apparent from FIG. 6, the front lens support frame 15a and the mirror support frame 16a appearing in FIGS. 5A and 5B (the mirror support frame 16a is not shown in FIG. 6) are rotatably supported by a rotation support part 18a of the lens barrel 18, and at the same time the rotation support part 18a supports the transmission lever 17a in a manner rotatable about the shaft 17b.

Further, the permanent magnets 15c, not shown in FIG. 6, and the yokes 15d having the respective permanent magnets 15c attracted thereto are mounted on the rotation support part 18a, which enables the front lens support frame 15a to pivotally move about the shaft 14d by electromagnetic coupling between the permanent magnets 15c mounted on the rotation support part 18a and the flat coil 15b mounted on the front lens support frame 15a.

The lens barrel 18 has a bottom part thereof provided with the panning actuator 19. The panning actuator 19 includes a coil base 19b held in a housing 19a, and a flat coil 19c is disposed on the coil base 19b.

Figure 8A:
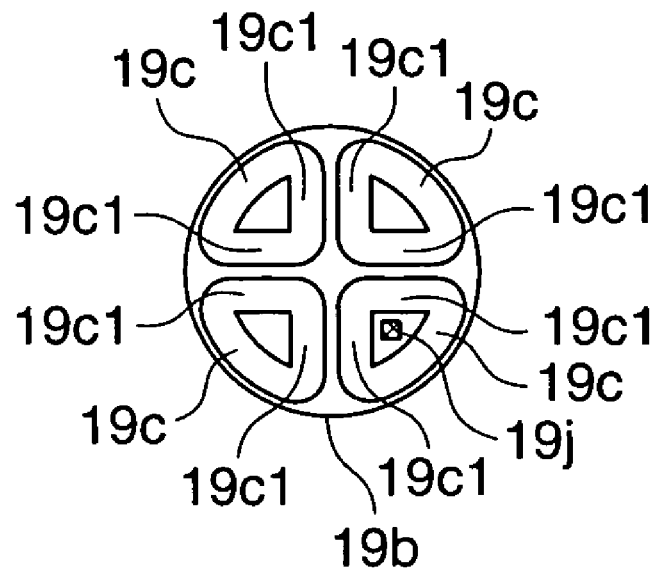
FIG. 8A is a top plan view showing the coil arrangement of a coil base of a panning actuator.
Figure 8B:
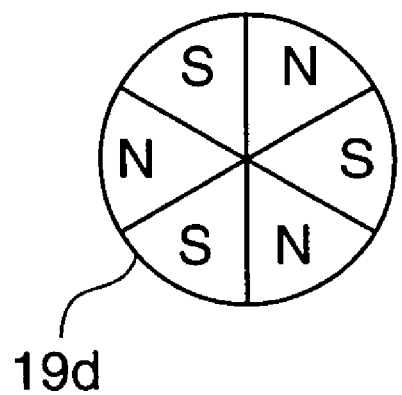
FIG. 8B is a diagram showing the layout of magnetized poles of a permanent magnet provided on the coil base.

FIGS. 8A and 8B are views showing the arrangement of the panning actuator. FIG. 8A is a top plan view showing the coil arrangement of the coil base 19b, and FIG. 8B is a view showing the layout of magnetized poles. On the coil base 19b, there are circumferentially arranged four flat coils 19c. A permanent magnet 19d is opposed to the flat coils 19c and magnetized as shown in FIG. 8B.

Referring again to FIG. 6, reference numerals 19e and 19f designate yokes provided for efficient use of magnetic flux generated by the permanent magnet 19d. With the provision of the yokes 19e and 19f, the permanent magnet 19d forms a closed magnetic path having the flat coils 19b arranged therein. A shaft 19g is rotatably supported by a bearing part 19h of the housing 19a and a bearing part 19i of the coil base 19b and fixed to the yokes 19e and 19f. Thus, the yokes 19e and 19f and the permanent magnet 19d are rotatable about the shaft 19g with respect to the housing 19a.

When the flat coils 19c are energized, a rotative driving force is generated about the shaft 19g due to the relationship between a driving force generation area 19c1 of each of the flat coils 19c in FIG. 8A, which are radially arranged, and the magnetizing direction of the permanent magnet 19d. However, if this relationship continues, the magnetizing direction opposed to the driving force generation areas 19c1 changes as the permanent magnet 19d rotates, and hence the rotation eventually stops.

The coil base 19b is provided with a magnetism-detecting element 19j such as a Hall element, as shown in FIG. 8A, and the direction of an electric current caused to flow through each flat coil 19c is reversed when the magnetism-detecting element 19j detects the rotation of the permanent magnet 19d. Thus, the rotation of the yokes 19e and 19f is continued.

In the panning actuator 19 constructed as above, the housing 19a is fixed to the video camera body 11, not shown in FIG. 6, and the yoke 19e is fixed to the lens barrel 18, so that the lens barrel 18 performs panning drive when the flat coils 19c are energized.

As shown in FIG. 7A, the laminated lens group 14j in the first-group is held by the first-group lens barrel 18b. Similarly, the second-group 14k is held by the second-group lens barrel 18c, the third-group 14l by the third-group lens barrel 18d, and the fourth group 14m by the fourth-group lens barrel 18e. A low-pass filter 14o is attached to a filter frame 18f and rigidly fixed to the image pickup device 14i to hold the image pickup device 14i in a completely sealed state, for protection against dust and dirt.

The image pickup device 14i is mounted on an image pickup base 113. The image pickup base 113 is supported by a correction actuator 114 having the same construction as that of the panning actuator 19 in a manner rotatable about the main optical axis 14a within the lens barrel 18.

The correction actuator 114, which is provided to correct the inclination of an image pickup screen, detects the inclination of the main body of the video camera (inclination thereof relative to the vertical direction) by a posture sensor 120, described hereinafter, and operates based on an output from the posture sensor 120, to thereby correct the inclination of the image pickup screen.

The panning actuator 19, which is provided for auto panning as an object of the present invention, also has the function of detecting a camera shake by a shake detecting device, such as an angular velocity sensor, provided in the video camera body 11, and operating based on an output from the shake detecting device. This function suppresses degradation of image quality due to a camera shake in the panning direction.

While the third-group lens barrel 18d is fixed to the lens barrel 18, the second-group lens barrel 18c and the fourth-group lens barrel 18e are supported in a manner slidable along a guide shaft 110a. The guide shaft 110a is supported in the lens barrel 18 as shown in FIG. 7A. Each of the second-group lens barrel 18c and the fourth-group lens barrel 18e has its rotation about the guide shaft 110a restricted by a rotation stopper shaft 111b supported by the lens barrel 18.

The second-group lens barrel 18c is engaged with a lead screw 111b, and moves along the main optical-axis 14a for zooming as the lead screw 111b is rotated by a zoom actuator 111a. The zoom actuator 111a implemented e.g. by a stepper motor has drive pulses input thereto controlled for shifting and stopping the second-group lens barrel 18c precisely to and at any desired position.

The forth group lens barrel 18e includes an annular yoke 112c having a U-shaped cross section, and a permanent magnet 112b attracted to the inside of the yoke 112c. A voice coil 112*a* is disposed in a magnetic path formed by the yoke 112*c* and the permanent magnet 112*b*. The voice coil 112*a* is mounted on the fixed third-group lens barrel 18*d*, and when energized, causes the fourth-group lens barrel 18*e* to move along the main optical axis 14*a* for focusing.

The third-group lens barrel 18*d* is provided with a magnetism-detecting element 112*d*, such as a Hall element, which monitors the position of the fourth-group lens barrel 18*e* by detecting the magnetism of the permanent magnet 112*b* disposed in the fourth-group lens barrel 18*e*. The fourth-group lens barrel 18*e* is drivingly controlled by negatively feeding an output from the magnetism-detecting element 112*d* back to the voice coil 112*a*.

Figure 9:
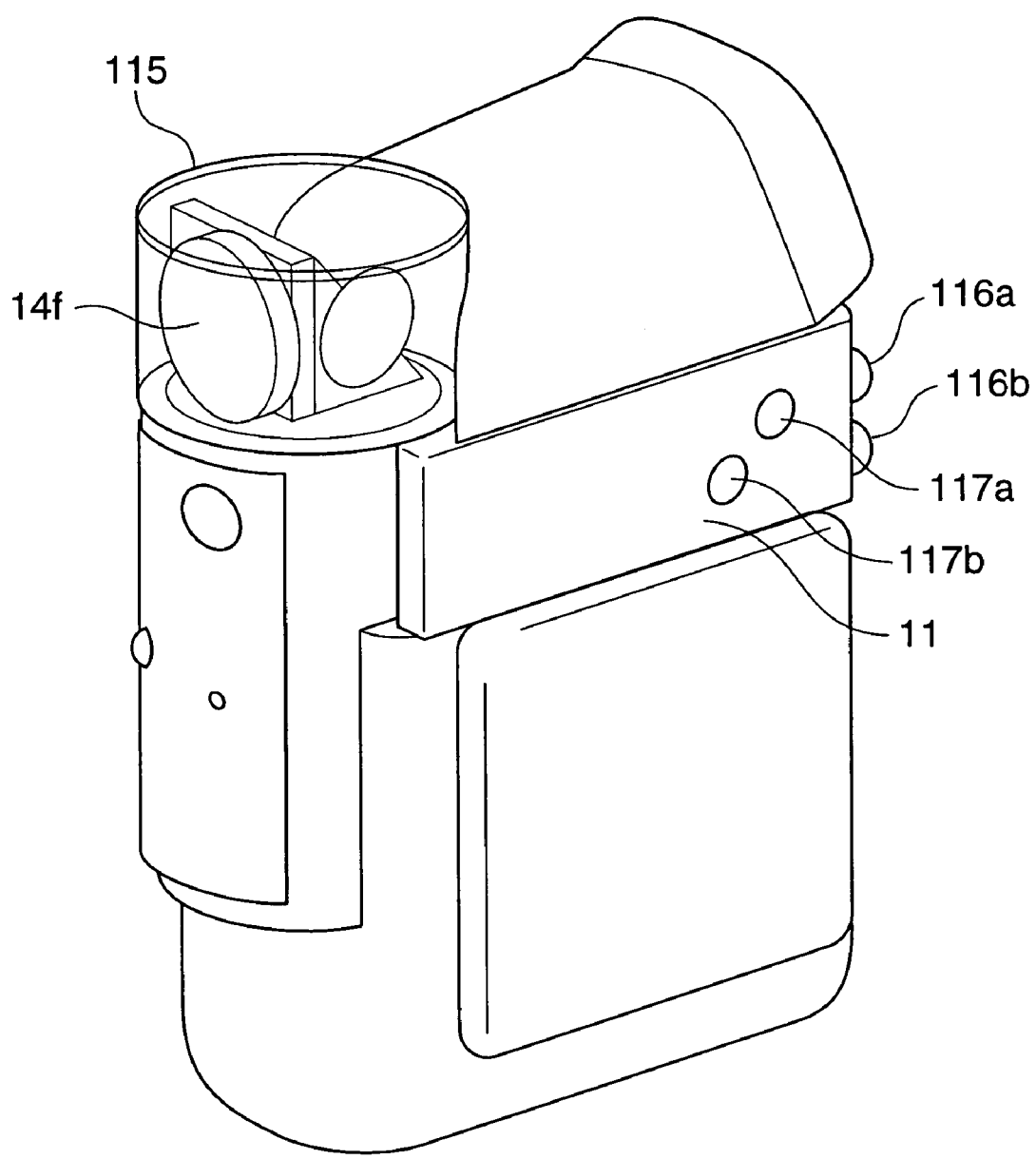
FIG. 9 is a perspective view showing the appearance of the photographing apparatus according to the first embodiment.

FIG. 9 is a perspective view showing the appearance of the video camera body 11 provided with the bending optical system 14 constructed above. A bending optical section formed by the front lens 14*f* and the mirror 14*c*, not shown in FIG. 9, is protected by a transparent protector 115. Within the protector 115, the lens barrel 18 performs a panning operation about the main optical axis 14*a*, and the front lens 14*f* and the mirror 14*c* perform a tilting operation.

Panning is performed by operating panning switches 116*a* and 116*b*. Each of the switches 116*a* and 116*b* also detects an operating force applied thereto. If the switch 116*a* is softly pressed, the shooting direction slowly turns clockwise, and if the switch 116*a* is strongly pressed, the shooting direction quickly turns clockwise. Similarly, if the switch 116*b* is softly pressed, the shooting direction slowly turns counterclockwise, and if the switch 116*b* is strongly pressed, the shooting direction quickly turns counterclockwise.

Tilting switches 117*a* and 117*b* operate similarly to the panning switches 116*a* and 116*b*. If the switch 117*a* is softly pressed, the shooting direction slowly turns upward, and if the switch 117*a* is strongly pressed, the shooting direction quickly turns upward. Similarly, if the switch 117*b* is softly pressed, the shooting direction slowly turns downward, and if the switch 117*b* is strongly pressed, the shooting direction quickly turns downward.

The major feature of the photographing apparatus of the present embodiment, the appearance of which is shown in FIG. 9, is that hand-held and stable panning shot can be carried out. The photographing apparatus enables the photographer to carry out very smooth panning and tilting shot without moving the video camera body 11, by operating the panning switches 116*a* and 116*b* with the video camera body 11 held in a hand and directed toward a certain direction.

Further, even if a camera shake occurs during hand-held shooting, shake correction is performed by the panning actuator 19 and the tilting actuator 15*f*, which makes it possible to obtain stable pictures.

Figure 10:
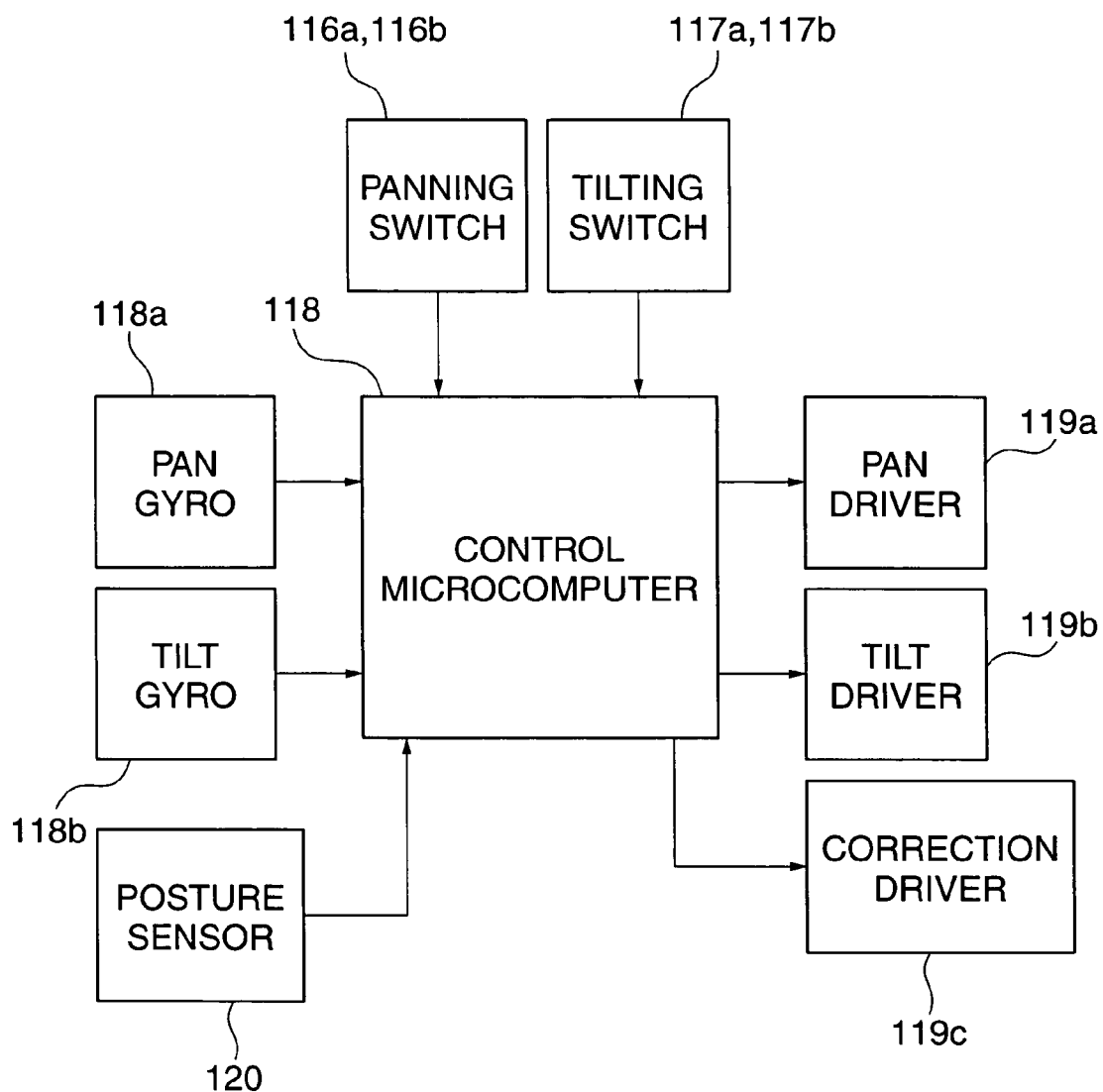
FIG. 10 is a block diagram showing the electrical system configuration of the photographing apparatus.

FIG. 10 is a block diagram showing the electrical system configuration of the photographing apparatus of the first embodiment. Elements unrelated to the present invention are omitted from the figure.

A control microcomputer 118 controls the overall operation of the video camera body 11. The control microcomputer 118 receives signals from the panning switches 116*a* and 116*b* and the tilting switches 117*a* and 117*b*.

Further, an output from a pan gyro 118*a* as a shake detecting device implemented by an angular velocity meter, such as a vibration gyro, for detecting a shake of the video camera body 11 in the panning direction, and an output from a tilt gyro 118*b* as a shake detecting device implemented by an angular velocity meter, such as a vibration gyro, for detecting a shake of the video camera body 11 in the tilting direction are subjected to amplification, DC cut, or other analog processing, as required, and then input to the control microcomputer 118.

Furthermore, an output from the posture sensor 120 implemented e.g. by a tilt sensor for sensing the degree of inclination of the video camera body 11 relative to the direction of gravity is also input to the control microcomputer 118.

The control microcomputer 118 controls a pan driver 119*a* based on information input thereto from the panning switches 116*a* and 116*b* and the pan gyro 118*a* to drive the panning actuator 19. Similarly, the control microcomputer 118 controls a tilt driver 119*b* based on information input thereto from the tilting switches 117*a* and 117*b* and the tilt gyro 118*b* to drive the tilting actuator 15*f*. Further, the control microcomputer 118 controls a correction driver 190*c* based on a signal from the posture sensor 120 to drive the correction actuator 114.

Thus, the control microcomputer 118 not only performs panning shot or tilting shot based on signals from the panning switches 116*a* and 116*b* or the tilting switches 117*a* and 117*b*, but also drives the panning actuator 19 based on a signal from the pan gyro 118*a* to correct a camera shake in the panning direction and drives the tilting actuator 15*f* based on a signal from the tilt gyro 118*b* to correct a camera shake in the tilting direction. Each of the pan gyro 118*a* and the tilt gyro 118*b* is provided with a new function in addition to the function of detecting a camera shake. The new function will be described below with reference to FIG. 11.

Figure 11:
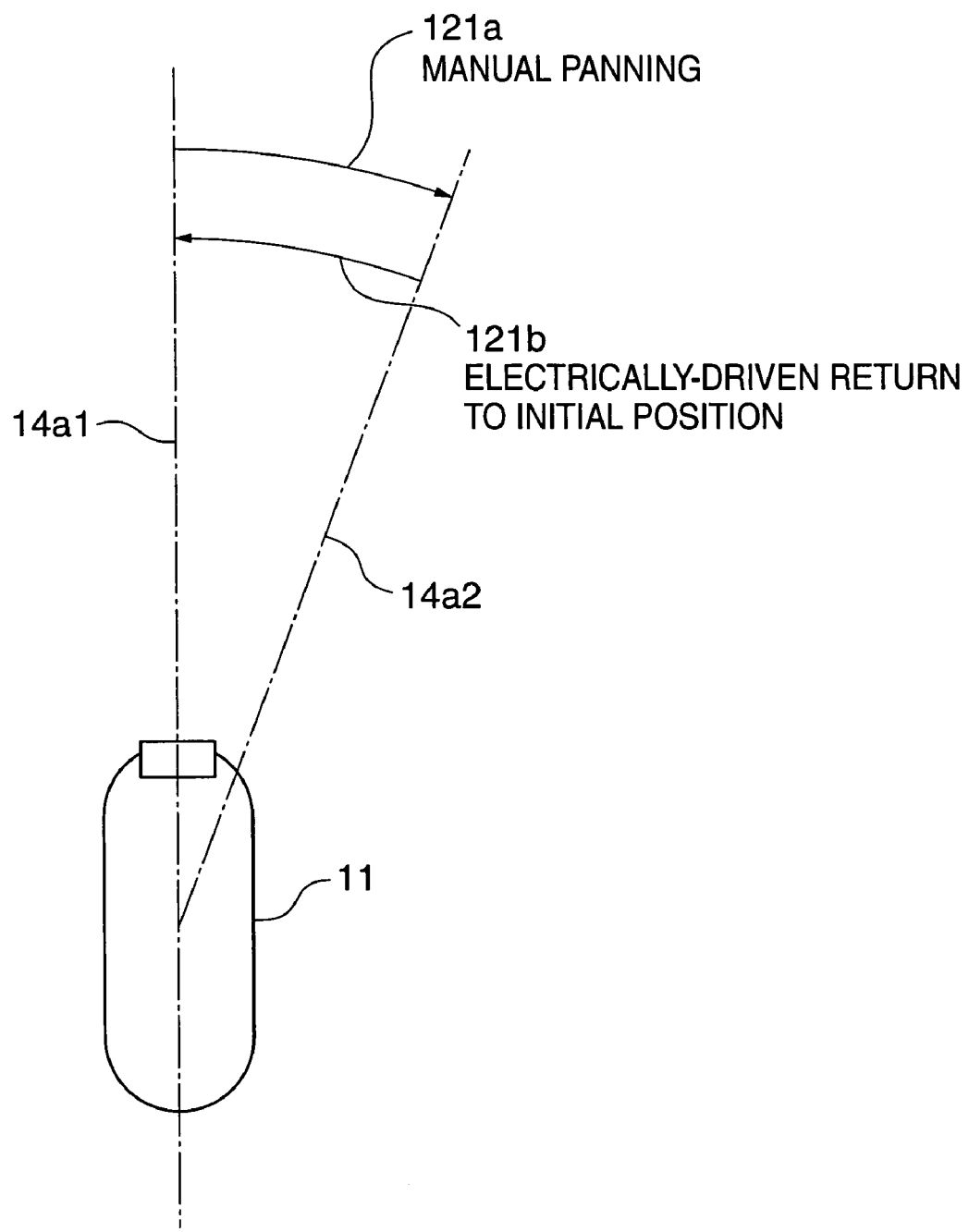
FIG. 11 is a diagram useful in explaining a panning operation according to the first embodiment.

FIG. 11 is a diagram useful in explaining the panning operation according to the first embodiment.

It is assumed here that the photographic optical axis of the video camera body 11 was directed in a direction 14*a*1 at the start of shooting, and then the photographer himself/herself turned the video camera body 11 in pursuit of an object to shift the photographic optical axis of the video camera body to a direction 14*a*2. Thereafter, e.g. when telephotography is being performed with a very few photographic background patterns, even if the photographer desires to return the shooting direction to its initial shooting position, it is very difficult to do so while viewing video.

Let it be assumed that during video recording of a baseball game, a photographer tries to return the composition from the first base to the home base immediately after having followed a runner running from the home base to the first base. In such a video shooting situation, telephotography adapted to a fairly long distance is often being performed with a narrow angle of view for observation and no background patterns, which makes it very difficult to return the composition to the home base.

As a solution to this problem, it can be envisaged that the angle of view is temporarily increased (i.e. the camera is zoomed wide) immediately after recording video of a scene on the first base has been completed, so as to confirm the home position of the video camera, and then panning is performed again to return the angle of view to its original state. However, this method requires time and labor for changing the angle of view each time, but makes reproduced video images unattractive.

To solve the problem, as shown in FIG. 11, when a request for returning the shooting direction to its initial shooting position is issued during a first panning operation (being continued until the runner reaches the first base) performed by the photographer, the panning actuator 19 is operated to return the shooting direction to its initial shooting position (photographic optical axis 14*a*1).

More specifically, the direction and amount of manual panning 121*a* carried out by the photographer are measured by the pan gyro 118a and the tilt gyro 118b during execution of the manual panning 121a, and when the shooting direction is to be returned to its initial shooting position as shown in FIG. 11 by reference numeral 121b, the panning actuator 19 is driven to return the shooting direction in a direction opposite to the determined direction by an amount equivalent to the measured amount. This makes it possible to accurately and speedily return the shooting direction to the initial shooting position even under a shooting condition where the initial shooting position cannot be confirmed due to a narrow photographic angle of view (due to telephotography).

Figure 12:
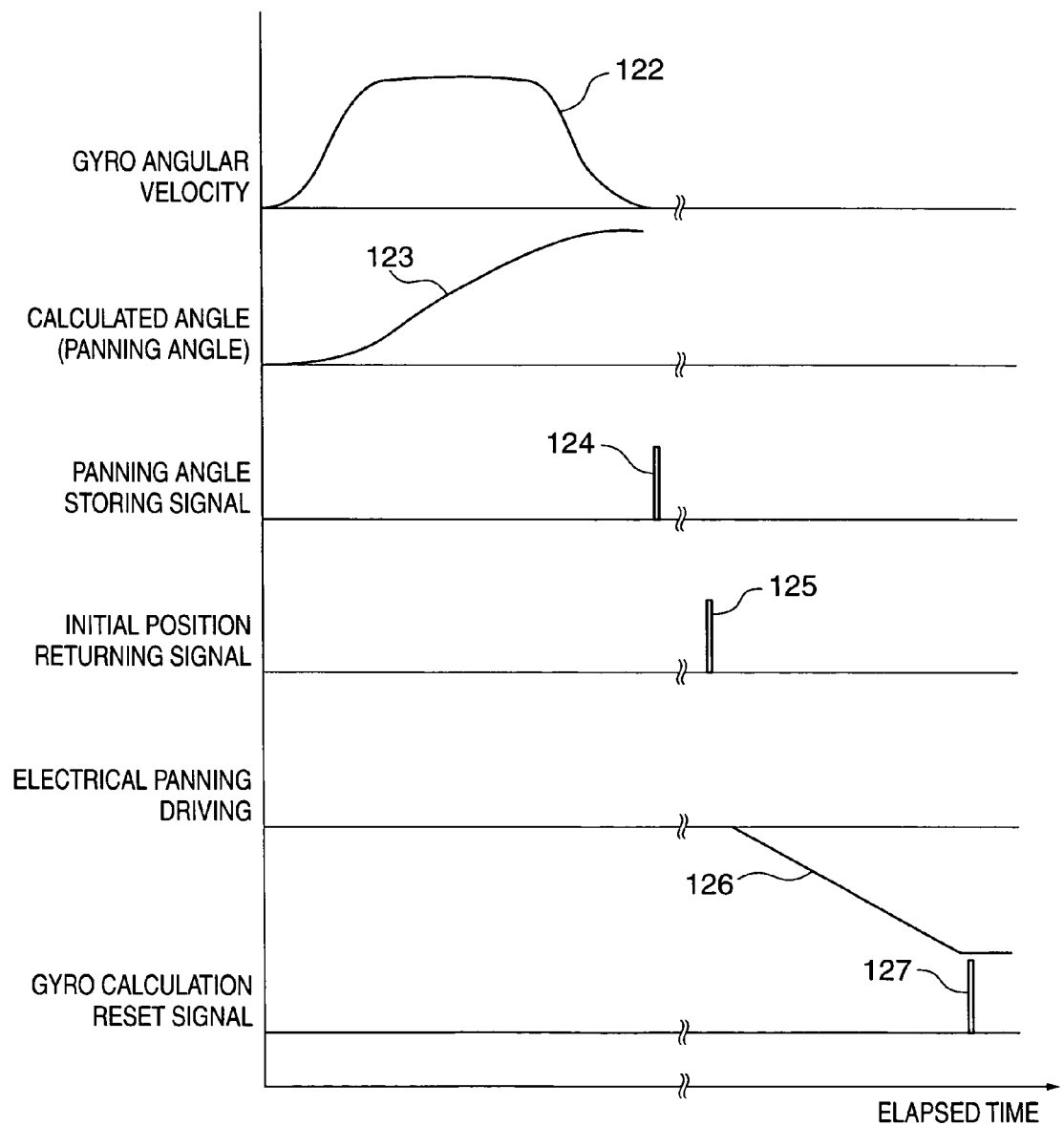
FIG. 12 is a timing diagram useful in explaining panning detection and a panning return operation according to the first embodiment.

FIG. 12 is a timing diagram useful in explaining panning detection and a panning return operation according to the first embodiment, in which is illustrated the status of each signal during the operation. The abscissas represents time elapsed, whereas what the ordinates represent differ from item to item. Therefore, the following description will be given on an item-by-item basis.

As to a first item "gyro angular velocity", the ordinate represents angular velocity, and a waveform 122 indicates that the angular velocity is accelerated immediately after the start of the manual panning, then held constant, and decelerated immediately before completion of the panning.

The next item "calculated angle" indicates an integral value of the above-mentioned angular velocity (panning angle). The ordinate represents the degree of angle. When the waveform 122 is integrated, the angle progressively changes as a waveform 123 shows, until it is finally held constant.

A panning angle storing signal 124 is generated when the gyro angular velocity decelerates to a level not higher than a predetermined value after an increase (acceleration) thereof. When the panning angle storing signal 124 is generated, the value of the calculated angle 123 assumed at this time is stored.

In general, a signal from an angular velocity meter, such as a gyro, is subjected to DC cut so as to facilitate panning and stabilize the signal. For this reason, the waveform 123 decreases again with the lapse of time after the CD cut, and finally becomes equal to zero. Therefore, the panning angle storing signal 124 is generated to store a value of the calculated angle obtained from the waveform 123, until generation of an initial position returning signal 125.

Then, when the initial position returning signal 125 is generated by the photographer's operation, the panning actuator 19 is operated by a signal corresponding to the stored calculated angle to return the shooting direction to its original shooting position (waveform 126; the ordinate represents the panning angle). When the shooting direction is returned by an amount corresponding to the stored calculated angle, a signal 127 for resetting a gyro calculation signal is output to reset the calculated value. This operation is executed so as to prevent occurrence of a discrepancy between the actual panning angle and the value calculated by the gyro due to a shift of the shooting direction alone in the video camera body 11 which actually remains unmoved.

In actuality, the pan gyro 118a and the tilt gyro 118b perform similar processing to store respective calculated angles in the panning direction and the tilting direction, so that even after the shooting direction is turned both in the panning direction and in the tilting direction, it is possible to stably return the shooting direction to its initial shooting position.

A description will be given of the operation explained above in more detail with reference to FIG. 13.

Figure 13:
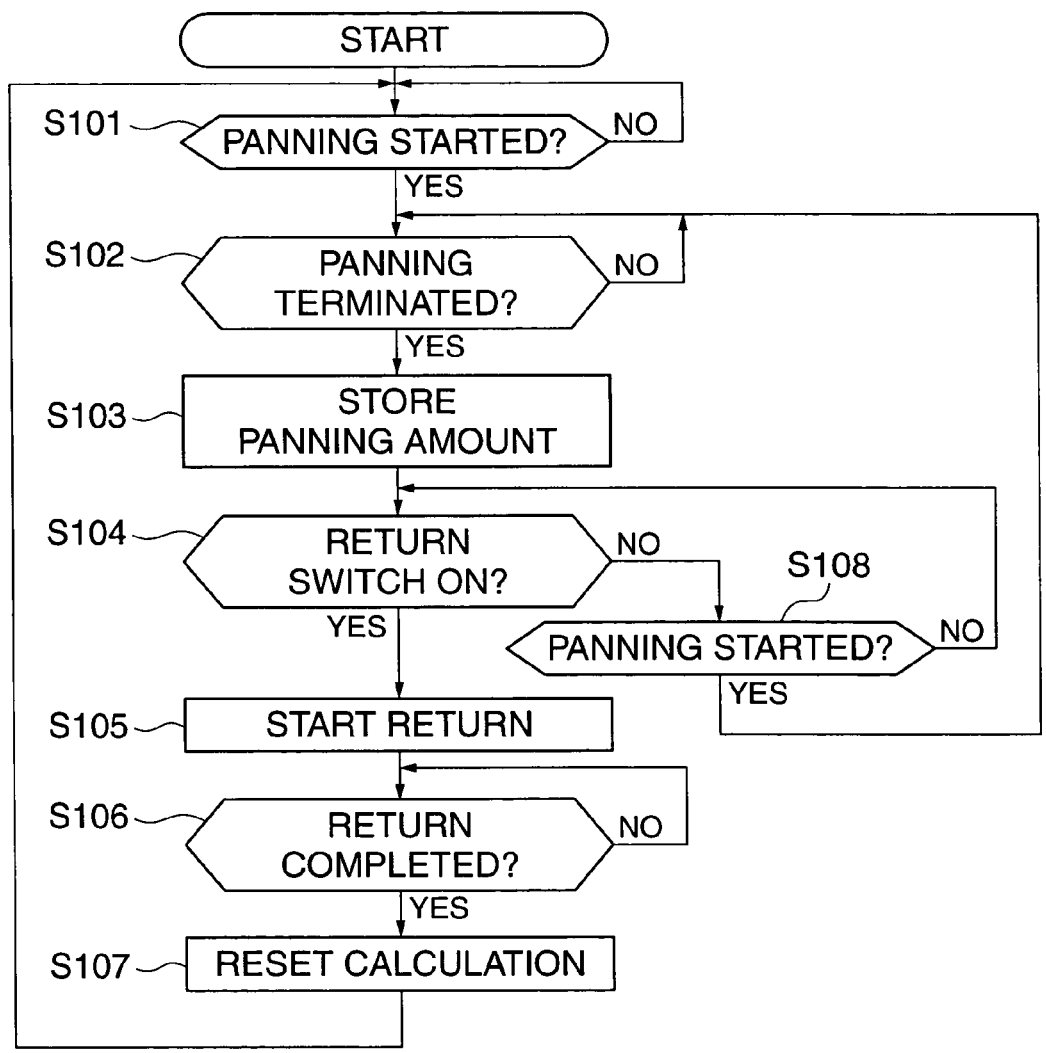
FIG. 13 is a flowchart showing a process for the panning return operation according to the first embodiment.

FIG. 13 is a flowchart showing a process for the panning return operation according to the first embodiment. The flow of the process starts when the power of the video camera body 11 is turned on.

In a step S101, the start of panning is awaited, and upon the start of panning, the process proceeds to a step S102. The start of panning is detected by the gyro, and when the gyro angular velocity is not lower than a predetermined value and when the integral value of the gyro angular velocity reaches a predetermined value, it is determined that panning has started.

In the step S102, the termination of the panning is awaited, and upon the termination of the panning, the process proceeds to a step S103. The termination of panning is detected when the gyro angular velocity becomes not higher than a predetermined value.

In the step S103, the panning angle storing signal is generated to store a panning angle (integral value of the angular velocity) in the control microcomputer 118. In the next step S104, it is determined whether or not an initial position return operation has been executed. If the initial position return operation has been executed, the process proceeds to a step S105, whereas if not, the process proceeds to a step S108.

In the step S105, the panning actuator 19 and the tilt actuator 15f are driven in response to the initial position return operation to start a return. In the next step S106, the completion of the return is awaited, and upon the completion of the return, the process proceeds to a step S107. In the step S107, the gyro calculation is reset, followed by the process returning to the step S101.

On the other hand, if it is determined in the step S104 that the initial position return operation has not been executed, the process proceeds to the step S108. In the step S108, it is determined whether or not further panning has been started. If the further panning has been started, the process returns to the step S102, wherein the termination of the panning is awaited. If the further panning has not been started, the process returns to the step S104, and the steps S104 and S108 are repeatedly carried out until the initial position return operation is started.

When the further panning is started, the panning angle is stored in the step S103 by adding the present panning angle to the preceding stored value.

The process configured as above makes it possible to speedily and reliably return the shooting direction to its initial position.

Next, a description will be given of a reason why the posture sensor 120 is provided as shown in FIG. 10.

The user who is performing a shooting operation with the video camera body 11 held in his or her hands might not notice a slight tilt of the video camera body 11 in the vertical direction. However, pictures picked up by the video camera body 11 thus accidentally tilted look unsightly when reproduced on a large monitor. With the downsizing of the video camera body 11, more and more users tend to perform shooting operations while they are unaware of such an accidental tilt of the video camera body 11. To cope with this, in the present embodiment, the posture sensor 120 is provided in the video camera body 11 to detect a tilt of the video camera body 11, and the correction actuator 114 is driven about the main optical axis 14a, based on the detected tilt, for tilt correction. Therefore, constantly stable shooting is ensured, which makes it possible to obtain excellent reproduced pictures.

Figure 14A:
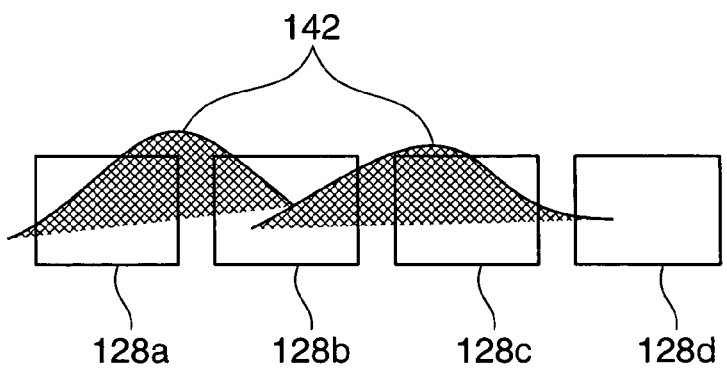
FIG. 14A is a diagram useful in explaining photographic frames obtained when normal panning is performed with the photographing apparatus held in a vertical state.
Figure 14B:
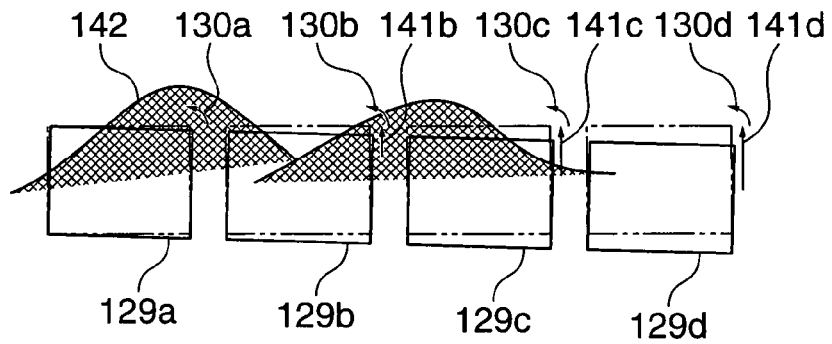
FIG. 14B is a diagram useful in explaining photographic frames obtained when normal panning is performed with the photographing apparatus held in a slightly tilted state.

Further, when the video camera body 11 is vertically tilted, there arises the following problem:

FIGS. 14A and 14B are diagrams useful in explaining normal panning. More specifically, these figures illustrate excerpts of frames shot when a panning shot (auto panning executed by driving the panning actuator 19) of the present embodiment is taken with the video camera body 11 vertically held. In an example shown in FIG. 14A, panning was successfully performed in the horizontal direction relative to a background 142 to obtain frames 128a to 128d.

However, for example, when a panning shot is taken with the video camera body 11 held in a state slightly tilted from the vertical direction, shot frames progressively deviate from the horizontal direction as the panning operation proceeds, as shown in FIG. 14B, and eventually, a frame 129d is largely deviated from the background 142.

To solve this problem, the photographing apparatus according to the present embodiment is configured such that even when a panning shot is taken with the video camera body 11 held in a state tilted from the vertical direction, the image pickup screen is corrected. Specifically, the posture sensor 120 is capable of detecting how much the video camera body 11 is inclined from the vertical direction, and hence it is possible to calculate the amount of deviation of each frame from the horizontal direction according to an output from the posture sensor 120 and a panning angle. Therefore, the tilting actuator 15f is driven to correct deviation of the pickup screen based on the calculated deviation amount. Further, the pickup device 14i is driven for correction about the main optical axis 14a by the correction actuator 114 to thereby correct the inclination of the pickup screen.

As shown in FIG. 14B, the frames 129b to 129d are shifted in respective directions indicated by arrows 141b, 141c, and 141d, by using the tilting actuator 15f. Further, the frames 129a to 129d are rotated for correction in respective directions indicated by arrows 130a to 130d, by using the correction actuator 114. Therefore, it is possible to take the same panning shot as that in FIG. 14A, as illustrated by chain lines in FIG. 14B.

Figure 15:
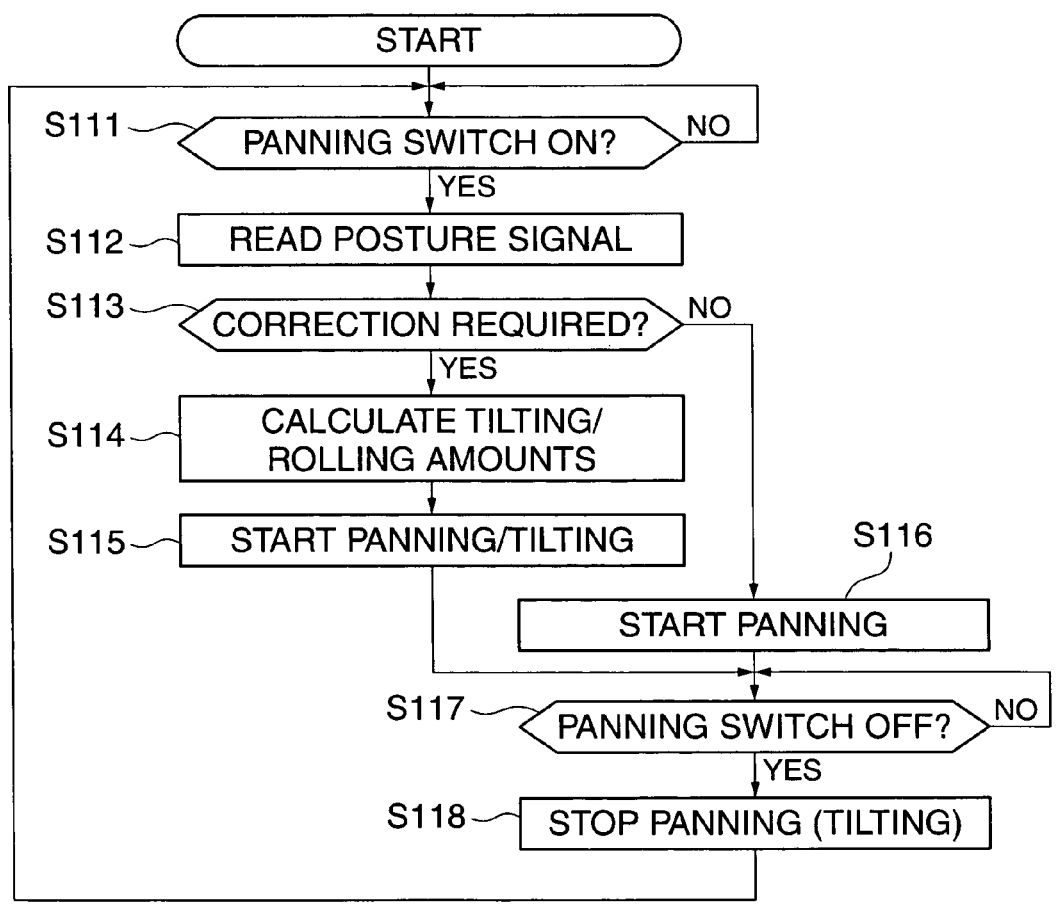
FIG. 15 is a flowchart showing a process for a panning correcting operation according to the first embodiment.

FIG. 15 is a flowchart showing a process for the panning correcting operation according to the first embodiment. The flow of the process starts when the power of the video camera body 11 is turned on.

First, in a step S111, turn-on of the panning switch 116a or 116b is awaited. In the next step S112, the control microcomputer 118 reads a signal from the posture sensor 120 and determines how much the video camera body 11 is inclined from the vertical direction.

Then, in a step S113, it is determined from the determined inclination angle whether or not the correction of the image pickup screen is required. If the correction is required, the process proceeds to a step S114, whereas if not, the process proceeds to a step S116.

In the step S114, an amount of shift by which each frame obtained by panning should be tilted (see the arrows 141b to 141d in FIG. 14B) and a degree of angle through which the frame should be rolled (see the arrows 130a to 130d in FIG. 14B) are calculated based on the determined inclination angle. Then, in a step S115, the lens barrel 18 is driven to perform panning, tilting, and rolling based on the calculated amount of shift and degree of angle.

In a step S117, turn-off of the panning switch 116a or 116b is awaited. That is, the lens barrel 18 is being driven to perform panning, tilting, and rolling before the turn-off of the panning switch 116a or 116b. When it is determined in the step S117 that the panning switch 116a or 116b has been turned off, the process proceeds to a step S118.

In the step S118, the panning shot and the corrections therefor (tilting and rolling) are stopped. If it is determined in the step S113 that no correction of the image pickup screen based on the determined inclination angle is required, the process proceeds to a step S116, wherein a normal panning shot (i.e. a panning shot taken using the panning actuator 19 alone) is started, followed by the process proceeding to the step S117.

In this way, even when the video camera body 11 is held in a tilted state, a panning shot is taken while correcting the image pickup screen, which makes it possible to constantly obtain a stable screen.

As described above, according to the present embodiment, the bending optical system is employed and alignment between the photographic optical axis and the panning axis is carried out to thereby make it possible to prevent the lens barrel 18 from projecting from the video camera body 11 when panning is performed, and further, the reflective surface for bending the optical axis and the taking lens are cooperatively driven for tilting, to thereby achieve downsizing of the taking lens barrel.

As described hereinbefore, in the photographing apparatus having the photographic optical system (bending optical system 14) comprised of the lenses (the front lens 14f and the laminated lens 14j, the second lens group 14k, the third lens group 14l, and the fourth lens group 14m) and the mirror 14c disposed therebetween (between two of the lenses e.g. between the front lens 14f and the laminated lens 14j, or between two of the lens groups), the predetermined lens (front lens 14f) or a predetermined lens group (although a single lens, such as the front lens 14f, is disposed on the object side of the mirror 14c, a plurality of lenses may be arranged on the object side of the mirror) of the lenses constituting the photographic optical system is rotated through an angle twice as large as an angle through which the mirror is rotated, to thereby change the shooting direction. Therefore, the photographing apparatus is provided with the linkage (transmission lever 17a in FIG. 5B) for pivotally moving the predetermined lens or lens group through double the angle of rotation of the mirror in accordance with the rotation of the mirror.

The linkage is configured to reduce the velocity of rotation of a member (front lens support frame 15a) that has a larger rotation amount, out of the members of the mirror and the predetermined lens or lens group and transmit the rotation to a member (mirror support frame 16a) that has a smaller rotation amount. For example, the rotational speed of the predetermined lens or lens group is reduced to half to use the same to cause pivotal movement of the mirror.

Thus, a smaller-size and high-performance tilting taking lens barrel whose size is not increased for panning operation is realized.

Further, the photographing apparatus is provided with a photographic optical system (bending optical system 14), a first scanning device (panning actuator 19) that scans the photographic optical system in a first direction (panning direction) on a plane orthogonal to the optical axis (object optical axis 14b), a second scanning device (tilting actuator 15f) that scans the photographic optical system in a second direction (tilting direction) different from the first direction on the plane, a third scanning device (correction actuator 114) that pivotally moves the image pickup screen of the photographic optical system about the optical axis, and a posture detecting device (posture sensor 120) that detects the posture of the photographic optical system about the optical axis, and is further provided with a drive control device (control microcomputer 118) that causes the first, second, and third scanning devices to cooperatively operate based on a signal from the posture detecting device, whereby stable panning is achieved.

Furthermore, the photographing apparatus is provided with locus recording devices (the pan gyro 118a and the tilt gyro 118b) that record the locus of the shooting direction, shooting direction-changing devices (the panning actuator 19 and the tilting actuator 15f) that scan the photographic optical system to change the shooting direction, a shooting direction-returning device (control microcomputer 118) that drivingly controls the shooting direction-changing devices based on signals from the locus recording devices to return the shooting direction to its initial position, and an information reset device (control microcomputer 118) that resets locus information recorded in the locus recording devices, in synchronism with the return of the shooting direction to its initial position, which makes it possible to prevent failure of panning shot.

Moreover, the photographing apparatus having the optical system comprised of the main optical section formed by the lenses (the laminated lens 14j, the second lens group 14k, the third lens group 14l, and the fourth lens group 14m) arranged along the photographic optical axis, the bending optical section (the front lens 14f and the mirror 14c) including the reflective surface for bending the photographic optical axis, and the image pickup section (image pickup device 14i) in which optical flux from the main optical section forms an image is provided with a first turning device (panning actuator 19) that pivotally moves the main optical section and the bending optical section in unison about the photographic optical axis, a second turning device (correction actuator 114) that pivotally moves the image pickup section about the photographic optical axis, and a drive control device (control microcomputer 118) that drivingly controls the first and second turning devices in unison, so that it is possible to reliably correct panning and a camera shake, as well as to correct inclination of the photographic optical axis, for stable panning shot.

Next, a description will be given of a second embodiment of the present invention.

The second embodiment is distinguished from the first embodiment described above only in the constructions of a tilting drive linkage and a panning drive linkage employed therein.

Figure 16A:
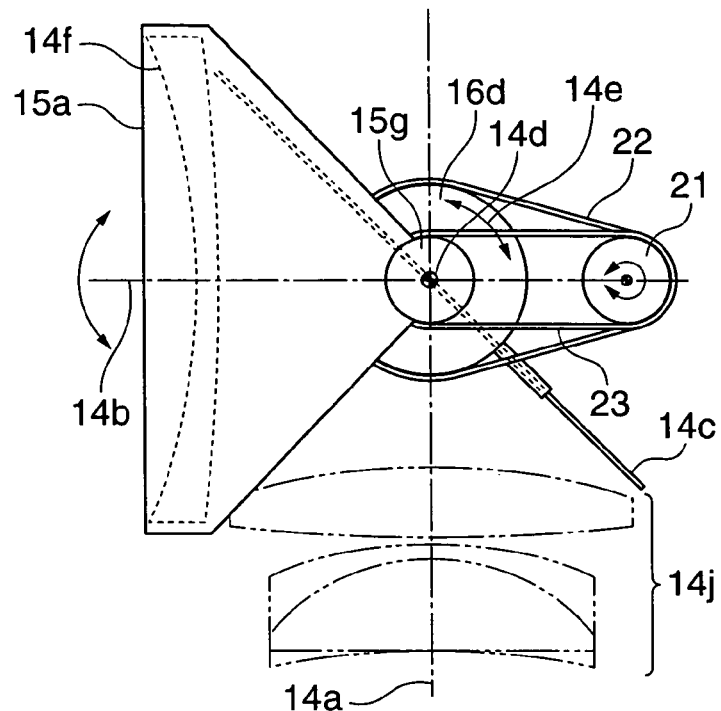
FIG. 16A is a side view showing a tilting drive linkage of a photographing apparatus according to a second embodiment of the present invention.
Figure 16B:
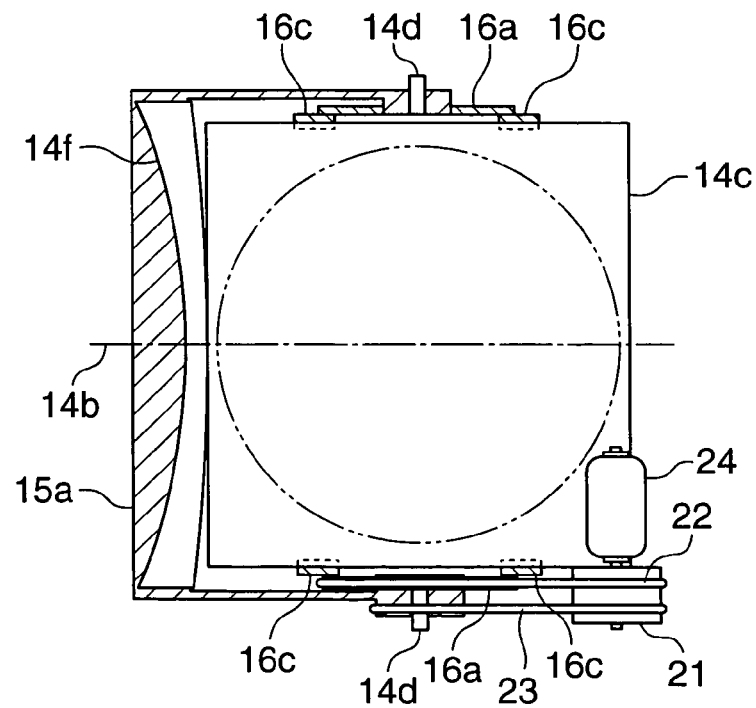
FIG. 16B is a top plan view of the tilting drive linkage.

FIGS. 16A and 16B are views showing the tilting drive linkage of a photographing apparatus according to the second embodiment. The tilting drive linkage is a mechanism that drives the mirror 14c and the front lens 14f in unison. FIG. 16A is a side view of the tilting drive linkage as viewed from the bending optical system shown in FIG. 2, and FIG. 16B is a top plan view of the tilting drive linkage.

In FIGS. 16A and 16B, the front lens support frame 15a holding the front lens 14f is supported by the shaft 14d such that the front lens support frame 15a can rotate about the shaft 14d in the directions indicated by the double-headed arrow 14e along with the front lens 14f.

A front lens support frame pulley 15g is fixed to one side surface of the front lens support frame 15a. The front lens support frame pulley 15g is linked by a front lens support frame belt 23 to a motor pulley 21 directly coupled to a motor 24, such that the ratio between the rotational angle of the front lens support frame pulley 15g and that of the motor pulley 21 is one-to-one. In short, the pulleys 15g and 21 have the same radius. Accordingly, the front lens support frame 15a is pivotally moved through the same angle as the rotational angle of the motor.

The mirror 14c is mounted on the fixture part 16c of the mirror support frame 16a. Similarly to the front lens support frame 15a, the mirror support frame 16a is supported by the shaft 14d in a manner rotatable along with the mirror 14c about the shaft 14d in the directions indicated by the arrow 14e. A mirror support frame pulley 16d is fixed to one side of the mirror support frame 16a. The mirror support frame pulley 16d is linked by a mirror support frame belt 22 to the motor pulley 21 directly coupled to the motor 24, such that the ratio between the rotational angle of the mirror support frame pulley 16d and that of the motor pulley 21 is one-to-two. Accordingly, the mirror support frame 16a is pivotally moved through half the rotational angle of the motor. In short, the radius of the mirror support frame pulley 16d is set to twice as large as that of the front lens support frame pulley 15g.

As described hereinbefore, when the rotational angle of the mirror 14c is set to θ, the angle change of the object optical axis 14b due to the reflection is equal to 2θ. For this reason, it is necessary to pivotally move the front lens 14f through 2θ to align the position of the front lens 14f with the object optical axis, so that the amount of rotation of the mirror 14c and that of the front lens 14f are adjusted using the above radius ratio.

The motor 24 is driven in response to an instruction from the control microcomputer 118 to perform tilting and shake correction based on outputs from the tilting switch 116a or 116b and the tilt gyro 118b.

Figure 17:
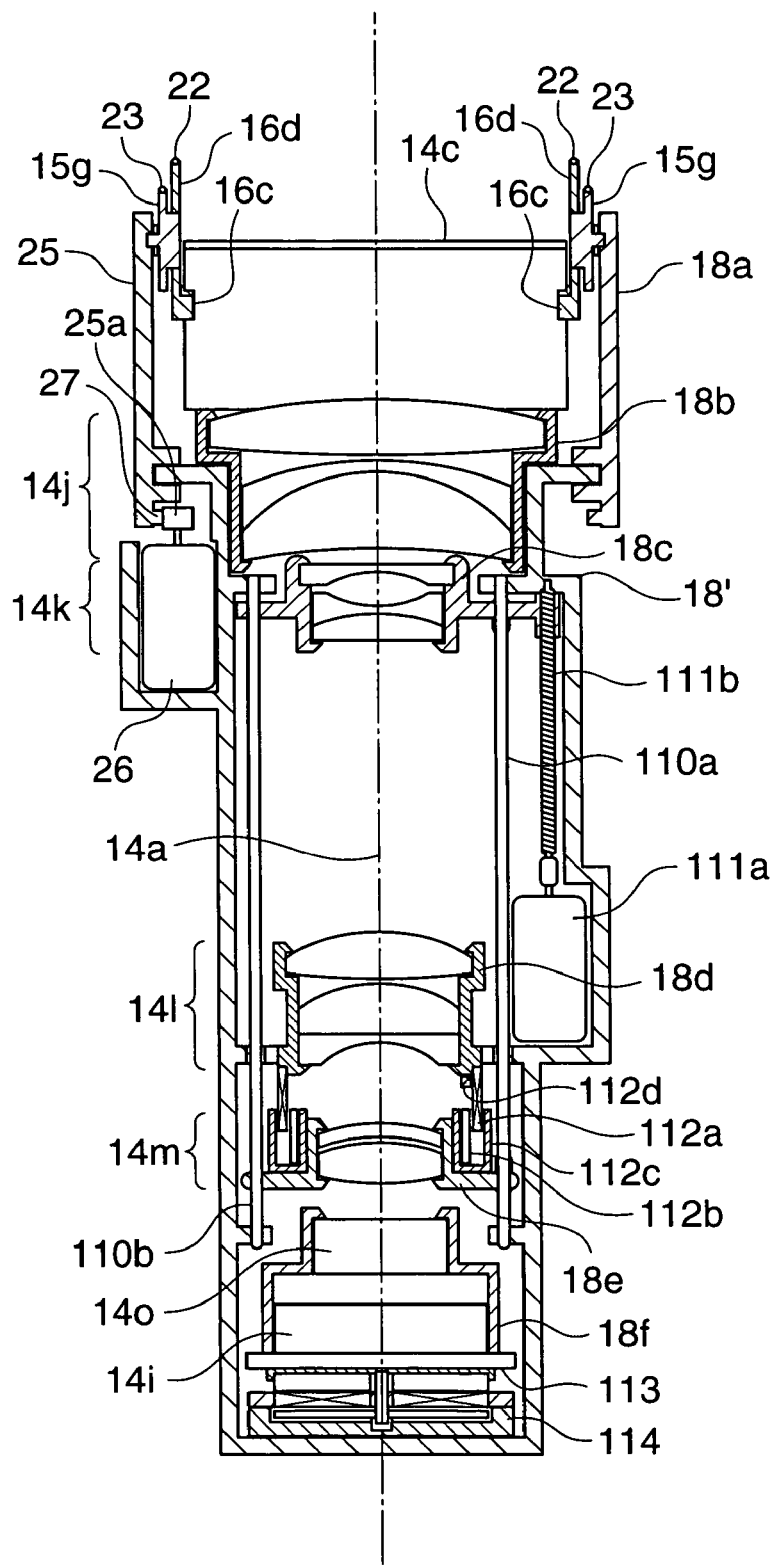
FIG. 17 is a cross-sectional view of a panning drive linkage of the photographing apparatus according to the second embodiment.

FIG. 17 is a cross-sectional view of the panning drive linkage of the photographing apparatus according to the second embodiment. The panning drive linkage is a mechanism that drives a lens barrel 18' accommodating the bending optical system 14. The internal construction of the lens barrel 18' is identical to that of the lens barrel 18 shown in FIG. 7A, and therefore description thereof is omitted.

The lens barrel 18' in the second embodiment is different from the lens barrel 18 in FIG. 7A in that the lens barrel 18' is fixed such that it is not rotated during panning shot. Therefore, in the present embodiment, the panning actuator 19 is dispensed with.

The lens barrel 18' is separated into a main body part accommodating the main optical section comprised of the laminated lens group 14j and the other lens groups and a bending lens barrel 25 accommodating the bending optical section comprised of the mirror 14c and the front lens 14f, and the bending lens barrel 25 is supported in a manner rotatable about the main optical axis 14a relative to the main body part of the lens barrel 18'. Further, a pinion 27 of a panning motor 26 provided in the lens barrel 18' is in mesh with an inner gear 25a disposed in the bending lens barrel 25, and therefore the bending lens barrel 25, and the mirror support frame 16a and the front lens support frame 15a within the bending lens barrel 25 rotate in accordance with rotation of the panning motor 26.

However, rotation of the bending optical section alone causes only rotation of an image about the main optical axis 14a with respect to the image pickup device 14i. To solve the problem, the correction actuator 114 rotates the image pickup device 14i by the same amount as that of rotation of the bending optical section in a manner synchronous with the rotation of the bending optical section. In short, panning is performed by rotating the bending optical section and the image pickup device 14i in unison. The advantage of this method is that it is not necessary to pivotally move the heavy lens barrel, and therefore panning shot with higher response can be achieved.

For shake correction as well, the bending optical section and the image pickup device 14i are driven in unison in response to a signal from the pan gyro 118a, whereby the effect of shake correction is enhanced. In the second embodiment, since the lens barrel is not rotated, the shake correction can be achieved with higher response than in the first embodiment. This makes it possible to correct even high-frequency shake to a sufficient degree e.g. during shooting performed on a vehicle.

As described above, according to the present embodiment, the predetermined lens (front lens 14f) or a predetermined lens group of the lenses is rotated through an angle twice as large as an angle through which the mirror is rotated, to thereby change the shooting direction. To this end, the photographing apparatus is provided with the linkage (the front lens support frame pulley 15g, the front lens support frame belt 23, the mirror support frame pulley 16, the mirror support frame belt 22, the motor pulley 21, and the motor 24 in FIG. 16B) for pivotally moving the predetermined lens or lens group through double the angle of rotation of the mirror in unison with the pivotal movement of the mirror. This makes it possible to prevent the lens barrel 18' from projecting from the video camera body 11 when panning is performed, as well as to achieve reduction of the size of the taking lens barrel, concerning tilting.

Further, the photographing apparatus having the optical system comprised of the main optical section formed by the lenses (the laminated lens 14j, the second lens group 14k, the third lens group 14l, and the fourth lens group 14m) arranged along the photographic optical axis, the bending optical section (the front lens 14f and the mirror 14c) including the reflective surface for bending the photographic optical axis, and the image pickup section (image pickup device 14i) in which optical flux from the main optical section forms an image is provided with a third turning device (panning motor 26) as an optical section turning device that pivotally moves the bending optical section about the photographic optical axis relative to the main optical section, a fourth turning device (correction actuator 114) as an image pickup section turning device that pivotally moves the image pickup section about the photographic optical axis, and a drive control device (control microcomputer 118) that drivingly controls the third and fourth turning devices in an interlocked manner, so that it is possible to perform stable panning shot as well as to achieve downsizing of the photographing apparatus and high response of the same.

Next, a description will be given of a third embodiment of the present invention.

The third embodiment is distinguished from the above described first embodiment only in the construction of a tilting drive linkage and an electrical system configuration employed therein.

Figure 18A:
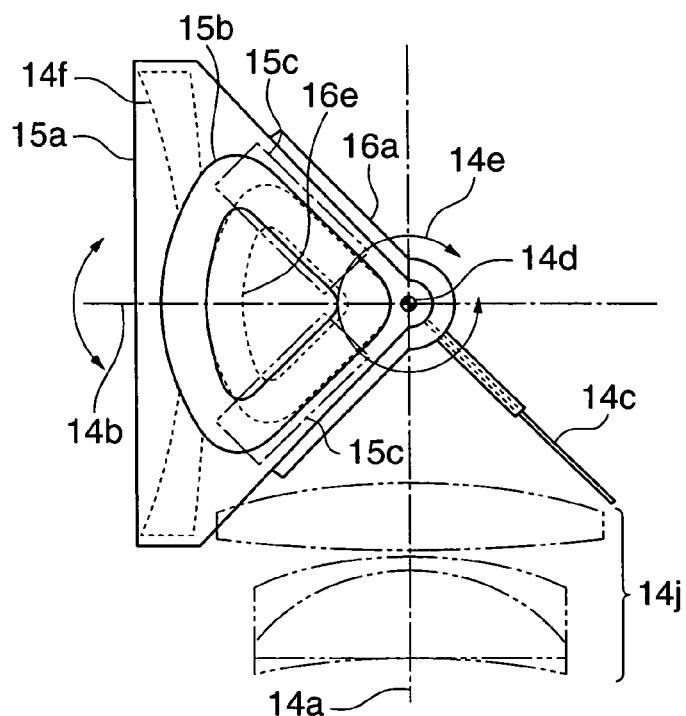
FIG. 18A is a side view showing a tilting drive linkage of a photographing apparatus according to a third embodiment of the present invention.
Figure 18B:
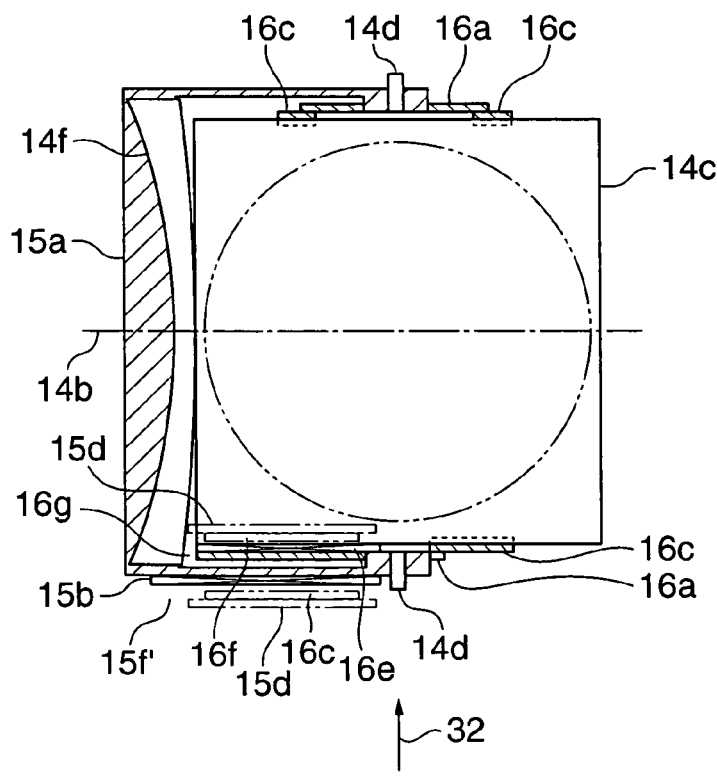
FIG. 18B is a top plan view, partly in section, of the tilting drive linkage.
Figure 18C:
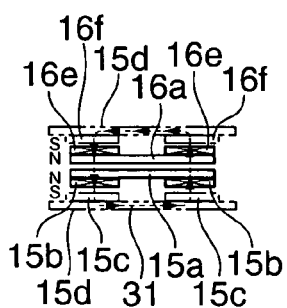
FIG. 18C is a fragmentary view showing in detail a part of the tilting drive linkage.

FIGS. 18A to 18C are views showing the tilting drive linkage of a photographing apparatus according to the third embodiment. The tilting drive linkage is a mechanism that drives the mirror 14c and the front lens 14f in unison. FIG. 18A is a side view, partly in section, of the tilting drive linkage as viewed from the bending optical system shown in FIG. 2, FIG. 18B a top plan view of the tilting drive linkage, and FIG. 18C a fragmentary view showing in detail a part of the tilting drive linkage.

In FIGS. 18A and 18B, the tilting drive linkage is different from the tilting drive linkage in FIGS. 5A and 5B in that the transmission lever 17a as a device for operating the front lens support frame 15a and the mirror support frame 16a in an interlocked manner is eliminated, and the mirror support frame 16a is also provided with a dedicated actuator in place of the transmission lever 17a.

Flat coils 16e are fixed to one side of the mirror support frame 16a (in FIG. 18A, the flat coils 16e are hidden behind the front lens support frame 15a, and hence shown by dotted lines), and a pair of permanent magnets 16f are disposed in facing relation to the flat coils 16e.

FIG. 18C is a front view of a tilting actuator, as viewed from a direction indicated by an arrow 32 in FIG. 18B, of the photographing apparatus according to the third embodiment.

The flat coils 16e provided in the mirror support frame 16a are sandwiched between the yokes 15d and the permanent magnets 15c together with the flat coils 15b provided in the front lens support frame 15a. The magnetizing direction of the permanent magnets 15c is indicated by N and S in FIG. 18C, and the permanent magnets 15c cooperate with the yokes 15d to form respective closed magnetic paths.

The flat coils 15b and 16e are both disposed within the respective magnetic paths, so that by energizing each of the coils, a driving force can be generated independently of each other. In short, it is possible to operate the two actuators by the single magnetic circuit, which contributes to downsizing of the photographing apparatus.

For the sake of distinction, the actuator formed by the flat coils 15b, the permanent magnets 15c, and the yokes 15d will be hereinafter referred to as the front lens support frame tilting actuator 15f', and the actuator formed by the flat coils 16e, the permanent magnets 15c, and the yokes 15d will be hereinafter referred to as the mirror support frame tilting actuator 16g.

If position feedback control is performed e.g. using outputs from position-detecting sensors, not shown, provided (attached to the respective yokes 15d, for example) for the front lens support frame tilting actuator 15f' and the mirror support frame tilting actuator 16g, respectively, the actuators 15f' and 16g can be drivingly controlled with precision and with high response.

FIG. 19 is a block diagram showing the electrical system configuration of the photographing apparatus according to the third embodiment.

The electrical system configuration in the present embodiment is different from that in FIG. 10 in that a tilt driver is separated into a front lens tilt driver 33 and a mirror tilt driver 34, each of which is controlled by the microcomputer 118.

The front lens tilt driver 33 drivingly controls the front lens support frame tilting actuator 15f', while the mirror tilt driver 34 drivingly controls the mirror support frame tilting actuator 16g.

The control microcomputer 118 drives the front lens support frame tilting actuator 15f' and the mirror support frame tilting actuator 16g in a synchronous manner in the same direction. In this case, the front lens tilt driver 33 and the mirror tilt driver 34 are drivingly controlled such that the mirror support frame tilting actuator 16g drives the mirror support frame 16a through half an angle through which the front lens support frame 15a is driven by the front lens support frame tilting actuator 15f'. This is because it is necessary to maintain a good optical relationship between the front lens 14f and the mirror 14c as described hereinabove concerning the first embodiment.

Not only when the tilt switch 117a or 117b is operated, but also when shake correction is performed based on a signal from the tilt gyro 118b, the mirror support frame tilting actuator 16g drives the mirror support frame 16a through half an angle through which the front lens support frame 15a is driven by the front lens support frame tilting actuator 15f', so as to perform driving for accurate shake correction.

In this way, by providing the dedicated actuators for driving the front lens 14f and the mirror 14c, respectively, for tilting, the device for driving the front lens 14f and the mirror 14c in an interlocked manner can be dispensed with, which makes it possible to prevent degradation of accuracy and response in tilting driving due to influence of abrasion caused by the device, as well as to electrically adjust the positional relationship between the front lens 14f and the mirror 14c.

As described above, according to the present embodiment, the predetermined lens (front lens 14f) or a predetermined lens group of the lenses is pivotally moved through an angle twice as large as an angle through which the mirror is rotated, to thereby change the shooting direction. To this end, the photographing apparatus is provided with the driving devices (the front lens support frame tilting actuator 15f' and the mirror support frame tilting actuator 16g) provided for the predetermined lens or lens group and the mirror, respectively, and the drive control device (control microcomputer 118) that drives the two driving devices in an interlocked manner for pivotally moving the predetermined lens or lens group through double the angle of rotation of the mirror. This makes it possible to prevent the lens barrel 18 from projecting from the video camera body 11 when panning is performed, as well as to achieve reduction of the size of the taking lens barrel provided with the tilting mechanism.

Next, a description will be given of a fourth embodiment of the present invention.

The fourth embodiment is distinguished from the above described embodiments in that the taking lens barrel having the optical system that bends object light to form an image on the image pickup device is configured to be rotatable in its entirety about two rotational axes such that a panning operation and a tilting operation are performed by rotation of the taking lens barrel about the respective rotational axes.

Figure 20A:
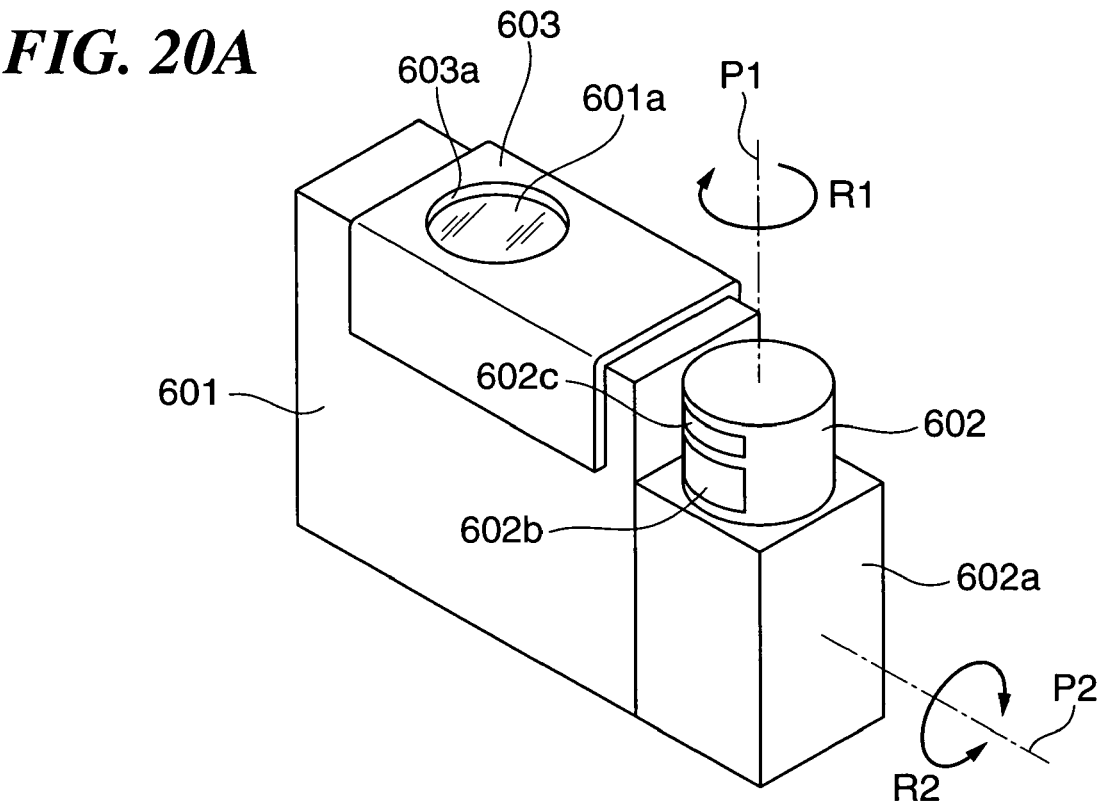
FIG. 20A is a perspective view of a photographing apparatus according to a fourth embodiment of the present invention.
Figure 20B:
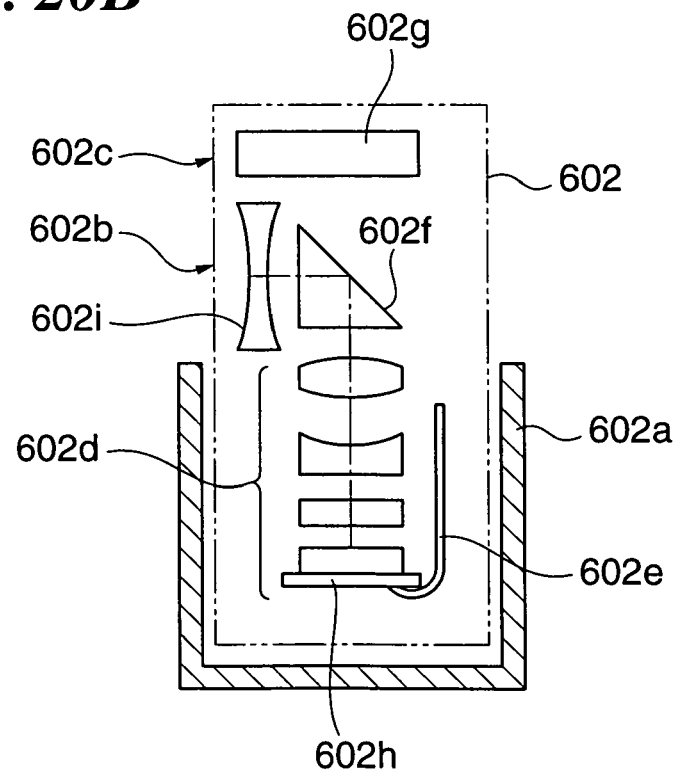
FIG. 20B is a perspective view showing the internal construction of a lens barrel unit of the photographing apparatus.

FIGS. 20A and 20B are views showing the construction of a photographing apparatus according to the fourth embodiment. FIG. 20A is a perspective view showing the appearance of the photographing apparatus as viewed from a front side thereof, and FIG. 20B a perspective view showing the internal construction of a lens barrel unit.

Referring to FIG. 20A, a video camera as the photographing apparatus according to the present embodiment is comprised of a cylindrical taking lens barrel 602 rotated by a motor, not shown, about a rotational axis P1 in a direction indicated by an arrow R1, a holder 602a supporting a part of the taking lens barrel 602 such that the part can rotate about the axis P1 of the lens barrel 602, and a video camera body 601.

Further, the holder 602a is supported on one side surface of the video camera body 601 in a manner rotatable about a rotational axis P2 extending in a direction perpendicular to the rotational axis P1, whereby the entire lens barrel unit comprised of the taking lens barrel 602 and the holder 602a supporting the taking lens barrel 602 is allowed to rotate in the plane directions of the one side surface of the video camera body 601, i.e. about the axis P2 perpendicular to the rotational axis P1.

Thus, a panning operation of the video camera of the present embodiment is performed by the rotation of the taking lens barrel 602 about the rotational axis P1, while a tilting operation of the same is performed by the rotation of the lens barrel unit about the rotational axis P2.

Further, a sliding barrier 603 having a U-shaped cross section is attached to the top of the video camera body 601. The barrier 603 is supported in a manner slidable on the video camera body 601 in the longitudinal (left-right) direction of the video camera body 601. In a state shown in FIG. 20A, when a main switch, not shown, is turned on, the camera enters a mode which allows shooting, and a release shutter button 601a for use in still image shooting is exposed from an opening 603a formed in the upper surface of the barrier 603. When the barrier 603 slides toward the taking lens barrel 602 from the state shown in FIG. 20A, the main switch is turned off, and the power supply to the camera is interrupted. At the same time, the barrier 603 covers openings 602b and 602c of the taking lens barrel 602 to prevent attachment of a fingerprint or dust to lenses within the taking lens barrel 602.

On the rear surface of the video camera body 601, there is disposed a large liquid crystal panel (601b in FIG. 21B) such that an object image input through the opening (light entrance window) 602b of the taking lens barrel 602 can be monitored. Since the lens barrel unit and the video camera body 601 are rotatable relative to each other about the rotational axis P2, the liquid crystal panel 601b can be used in a vertically tilted state as well. Further, although not shown, operation switches including a function switch for setting various modes, such as a remote control mode, are arranged on the front surface of the video camera body 601.

As shown in FIG. 20B, the lens barrel unit has a construction in which the taking lens barrel 602 is supported in the holder 602a in a rotatably engaged manner. Within the taking lens barrel 602, an objective lens (front lens) 602i, a reflective prism 602f, a known zooming optical system 602d, and a CCD 602h as an image pickup unit are sequentially arranged along the photographic optical axis. The reflective prism 602f is disposed in the vicinity of the opening (light entrance window) 602b formed in an upper end of the taking lens barrel 602 as viewed in FIG. 20B, for taking in flux of object light. The taking lens barrel 602 forms the bending optical system in which the photographic optical axis passing through the opening 602b and the front lens 602i. is bent substantially at 90 degrees by the reflective prism 602f.

The CCD 602h is connected to a flexible printed circuit board 602e. The flexible printed circuit board 602e is provided with known wiring for aperture driving, focus driving, and zoom driving, and the wiring is connected to a mounting section within the video camera body 601 such that even when the taking lens barrel 602 rotates leftward or rightward through 360 degrees, the power supply and signal lines are not detached from the mounting section in the video camera body 601.

Further, the taking lens barrel 602 is provided with an electronic flash 602g with a light emission side thereof directed in an incoming light incident direction, and the opening 602c serves as a window through which light emitted from the electronic flash 602g is irradiated toward an object.

Thus, the photographing apparatus according to the present embodiment is constructed such that the photographic optical axis is bent through approximately 90 degrees at the end of the taking lens barrel 602, and the taking lens barrel 602 is rotated about the axis thereof (rotational axis P1), which makes it possible to rotate the taking lens barrel 602 through a large angle without a large space provided therefor.

With the arrangement described above, not only a normal shooting mode shown in FIG. 20A in which the user performs shooting with the video camera in his/her hand, but also other different shooting modes exemplified in FIGS. 21A and 21B and FIGS. 22A and 22B are also possible.

Figure 21A:
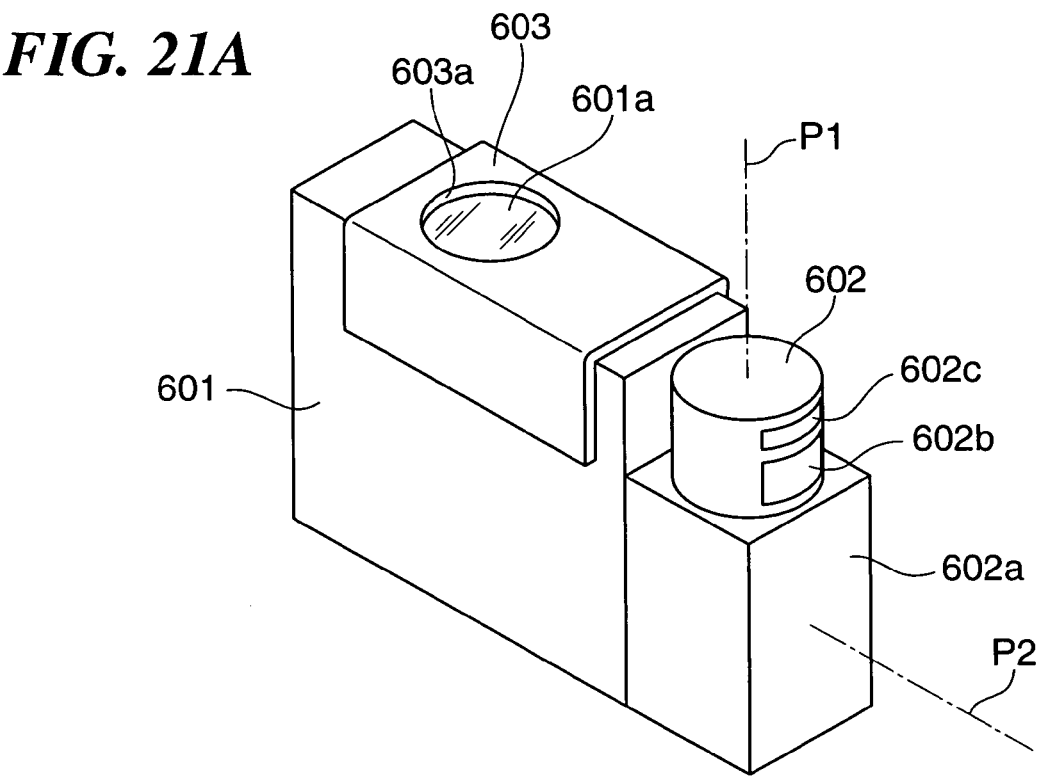
FIG. 21A is a perspective view showing the appearance of the photographing apparatus according to the fourth embodiment in a laterally directed photographing mode.
Figure 21B:
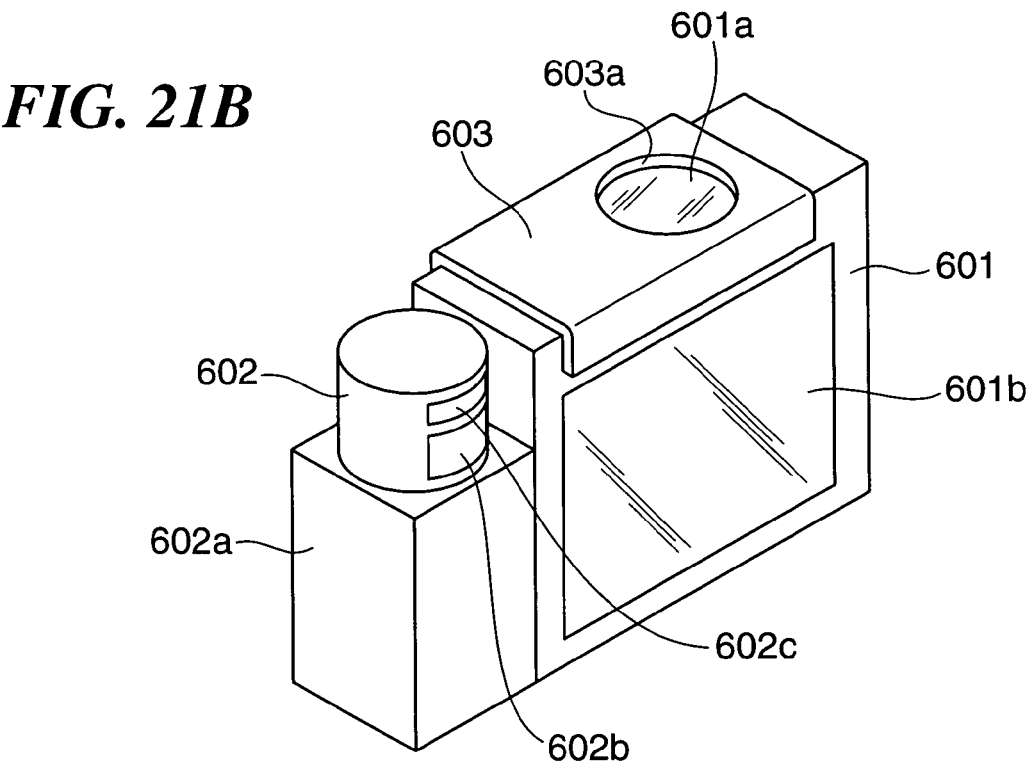
FIG. 21B is a perspective view showing the appearance of the photographing apparatus in a rearwardly-directed photographing mode.

FIGS. 21A and 21B are perspective views showing the appearance of the photographing apparatus according to the present embodiment in other shooting modes. FIG. 21A is a perspective view showing the appearance of the photographing apparatus in a laterally-directed shooting mode, in which the user performs shooting in a lateral direction with respect to the video camera body while viewing the liquid crystal panel 601b. FIG. 21B is a perspective view showing the appearance of the photographing apparatus in a rearwardly-directed shooting mode e.g. for shooting the user viewing the liquid crystal panel 601b. It should be noted that in the shooting modes shown in FIGS. 21A and 21B, in which the user performs shooting while viewing the liquid crystal panel 601b, the photographing apparatus can be used with the liquid crystal panel 601b vertically tilted.

Figure 22A:
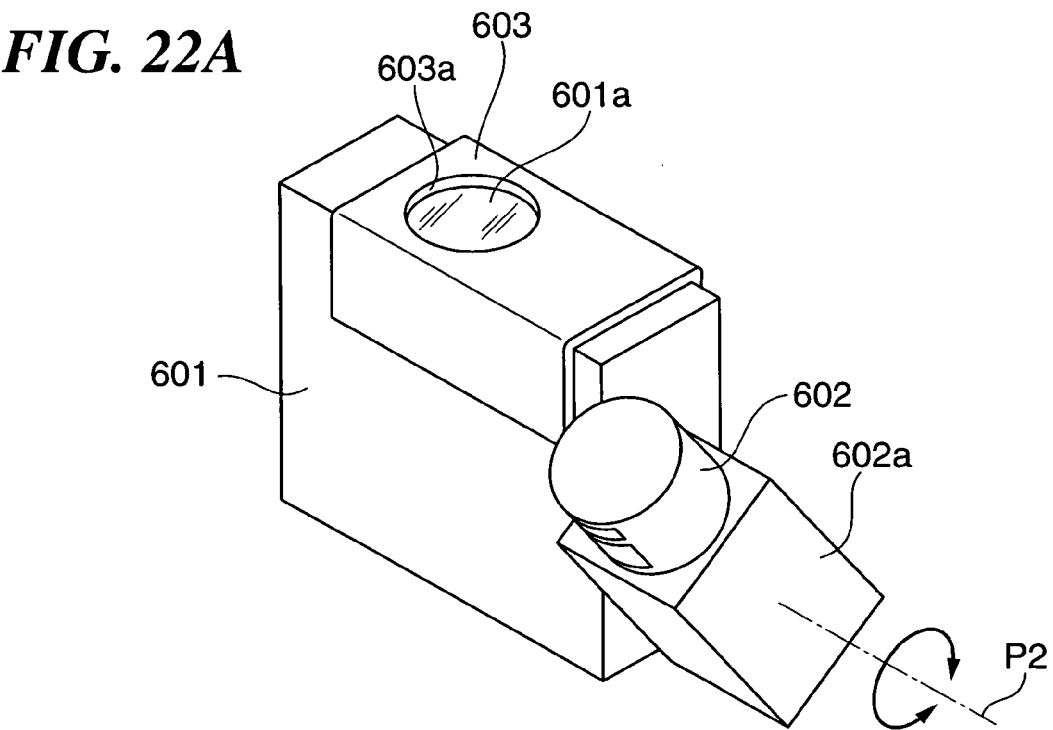
FIG. 22A is a perspective view showing the appearance of the photographing apparatus according to the fourth embodiment in another photographing mode.
Figure 22B:
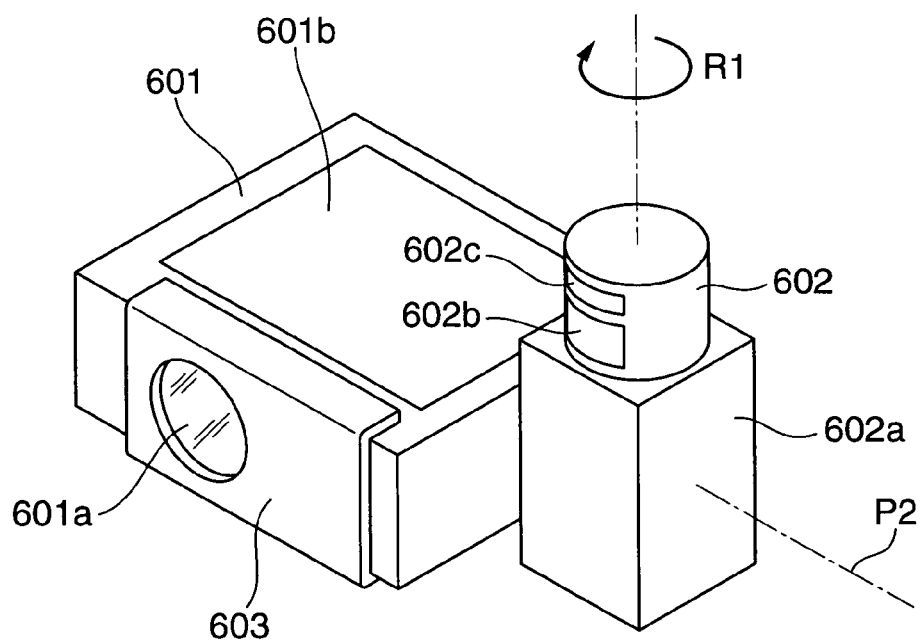
FIG. 22B is a perspective view showing the appearance of the photographing apparatus in still another photographing mode.

On the other hand, FIGS. 22A and 22B are perspective views showing the appearance of the photographing apparatus according to the present embodiment in still other shooting modes. FIG. 22A shows a tilting shot mode for performing shooting in the vertical direction while rotating the entire lens barrel unit about the rotational axis P2. FIG. 22B shows a shooting mode suitable for remote control, in which the taking lens barrel 602 is allowed to capture an object field at almost all of 360 angles in lateral directions with respect to the video camera body.

Figure 23:
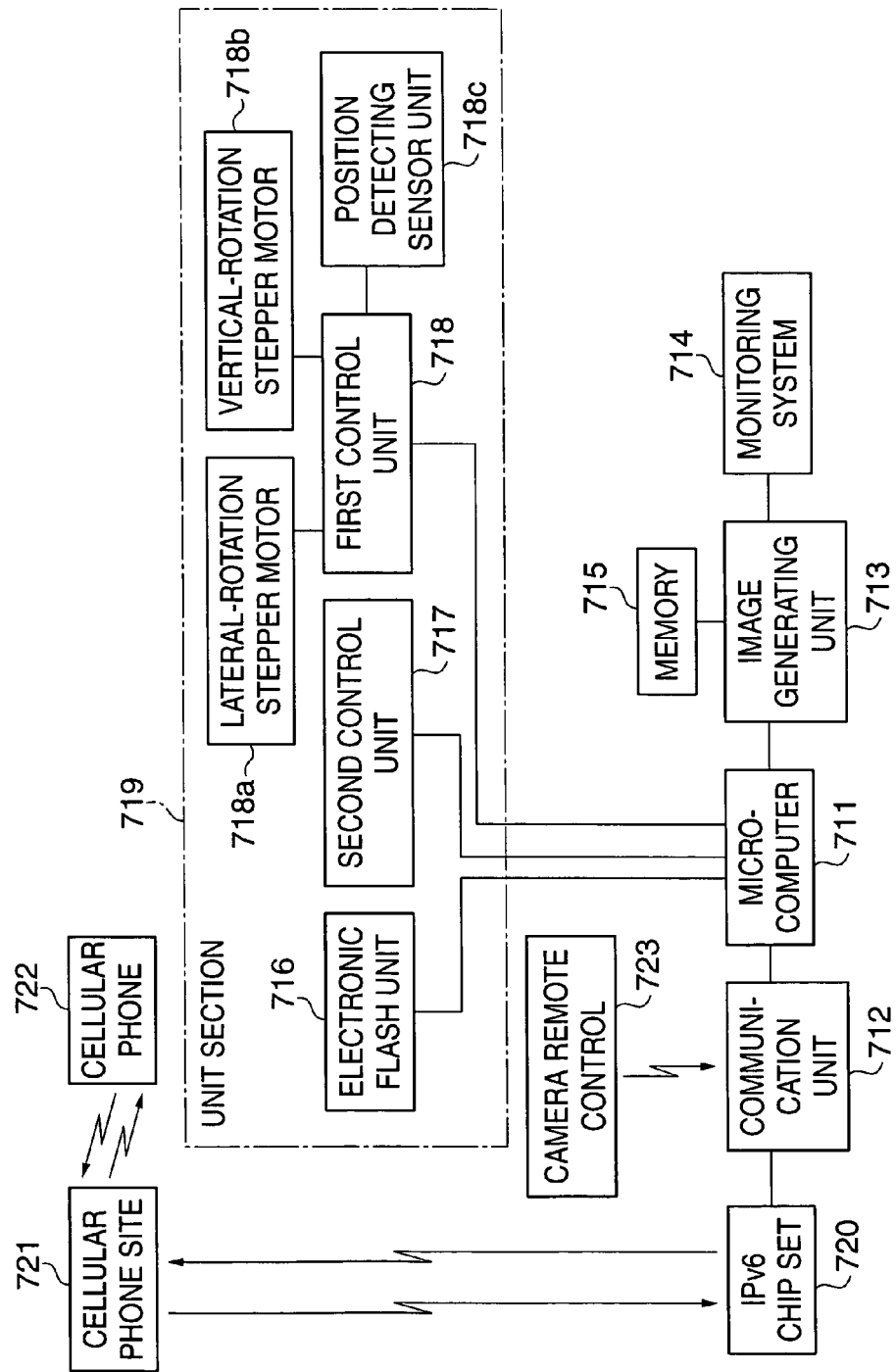
FIG. 23 is a block diagram showing circuit blocks of the photographing apparatus according to the fourth embodiment.

FIG. 23 is a block diagram showing circuit blocks of the photographing apparatus according to the present embodiment.

The video camera according to the present embodiment includes a microcomputer 711 that controls the overall sequence of operations of the camera, a communication unit 712, and an image generating unit 713. The communication unit 712 is provided with an infrared ray receiver so that infrared communication signals from a camera remote control 723 can be received. The camera remote control 723 is provided with various operation switches, such as panning switches used for panning operations and tilting switches used for tilting operations.

The image generating unit 713 converts an image pickup signal from the CCD 602h into a video signal and outputs the video signal to a monitoring system 714 (the liquid crystal panel 601b implements a monitoring screen) and a memory 715 including a recording medium. Further, an IPv6 chip set 720 that transmits and receives IPv6 (Internet Protocol, Version 6) packets is connected, e.g. as an adapter, to the communication unit 712. The IPv6 chip set 720 is assigned an IP address for wireless connection to a known cellular phone site 721 on the Internet, and is configured to be capable of sending images currently picked up by the video camera of the present embodiment to the cellular phone site 721. The photographer is enabled to access the cellular phone site 721 using a cellular phone 722 so as to receive information containing video images from the cellular phone site 721 in real time and operate the video camera.

A unit section 719 within the taking lens barrel 602 is provided with a first control unit 718, a lateral-rotation stepper motor 718a, a vertical-rotation stepper motor 718b, a position detecting sensor unit 718c, an electronic flash unit 716, and a second control unit 717. The first control unit 718 drivingly controls the stepper motors 718a and 718b in response to instructions from the microcomputer 711 for a panning operation and a tilting operation, and controls lateral and vertical rotation amounts of the taking lens barrel 602 while detecting the rotational positions of the respective stepper motors 718a and 718b by the position detecting sensor unit 718c. The second control unit 717 controls the exposure, focusing, and zooming of the taking lens barrel 602.

The electronic flash unit 716 includes the electronic flash 602g and a control circuit therefor. Since the electronic flash unit 716 is thus provided in the taking lens barrel 602, the electronic flash 602g is always directed in a direction allowing efficient illumination when flash shooting is performed automatically e.g. in a situation where an object is dark.

Figure 24A:
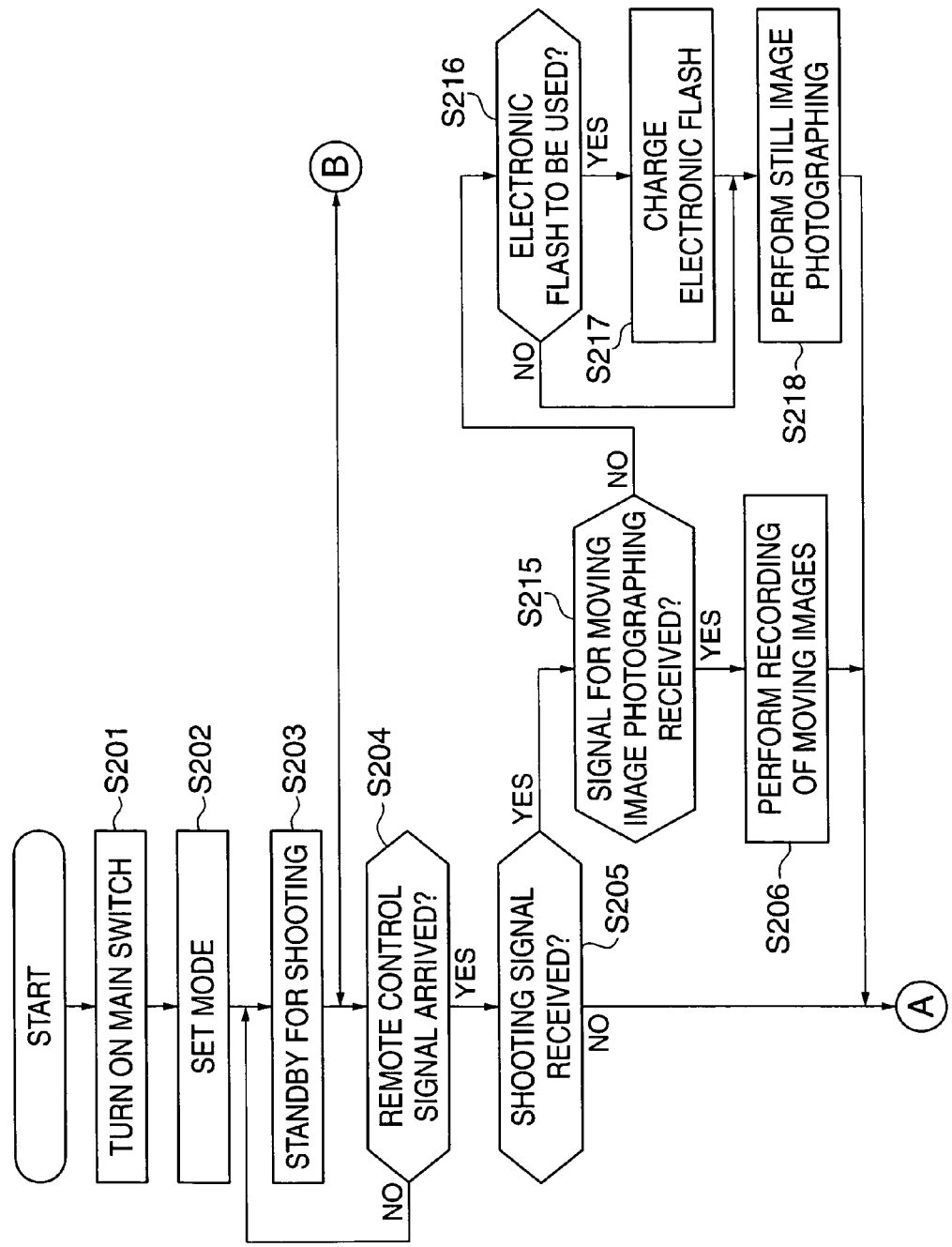
FIGS. 24A and 24B are flowcharts showing a process for a panning operation and a tilting operation of the photographing apparatus according to the fourth embodiment.
Figure 24B:
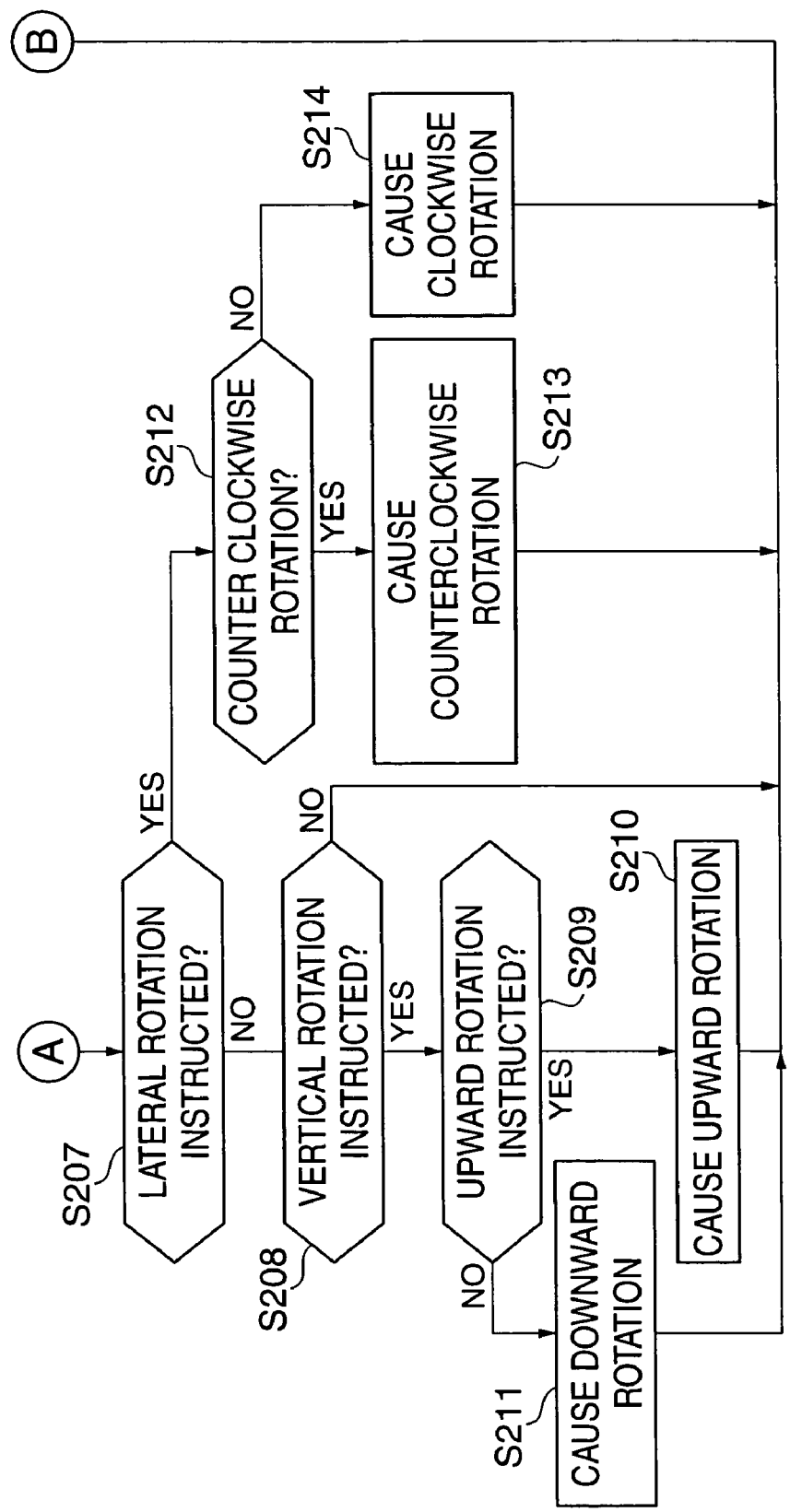
Figure 25A:
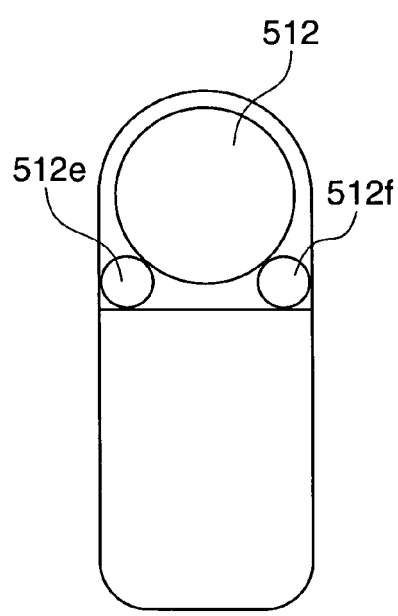
FIG. 25A is a front view showing, by way of example, a conventional consumer video camera.
Figure 25B:
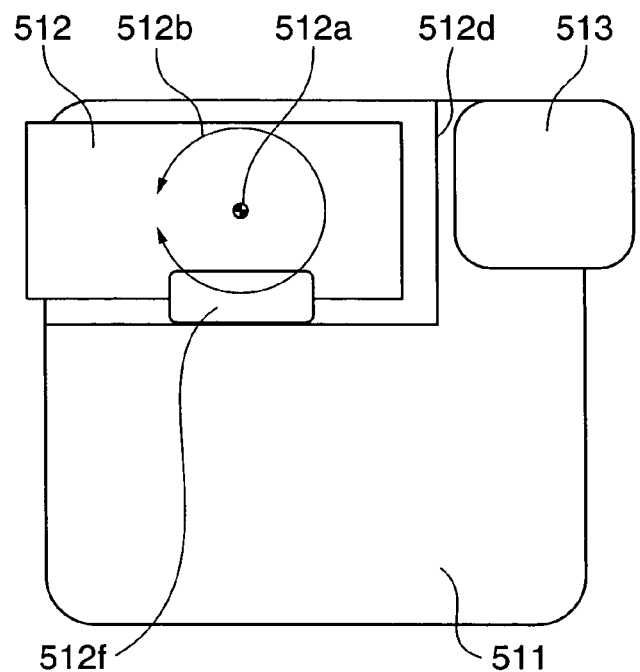
FIG. 25B is a side view of the video camera.
Figure 25C:
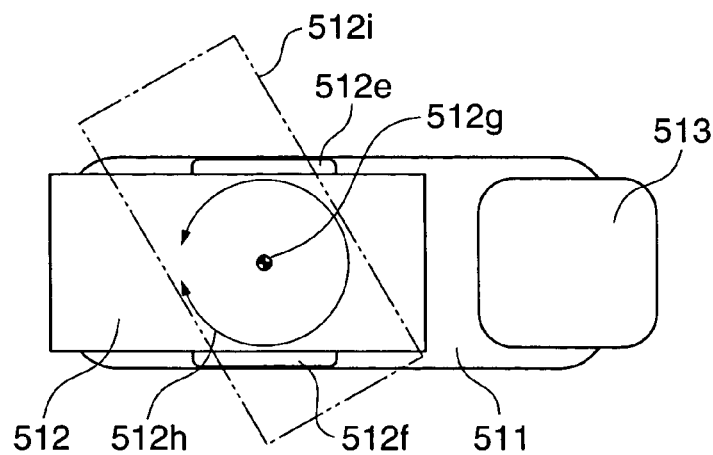
FIG. 25C is a top plan view of the video camera.

FIGS. 24A and 24B are flowcharts showing a process for a panning operation and a tilting operation of the photographing apparatus according to the fourth embodiment.

When the photographer slides the barrier 603 of the video camera of the present embodiment and exposes the taking lens barrel 602 in a situation like a home party, the main switch is turned on in a step S201. Then, when the photographer sets the function switch provided on the video camera body 601 to the remote control mode in a step S202, the video camera enters a standby state for remote control shooting performed using the remote control 723 in a step S203.

It is assumed that in the standby state for remote control shooting, the photographer places the video camera e.g. on a table in the rearwardly-directed shooting mode shown in FIG. 21B, and then moves toward an object with the camera remote control 723 in his/her hand. At this time, the video camera is awaiting input of a remote control signal as an instruction signal from the remote control 723 (step S204).

When the photographer presses the panning switch or the tilting switch of the remote control 723 while viewing the monitor 601b so as to bring a photographic composition to a proper position, the video camera accepts a remote control signal in the step S204. Then, the process proceeds to a step S205, wherein it is determined whether or not a shooting signal has been received. If it is determined in the step S205 that no shooting signal has been received yet, the process proceeds to a step S207, wherein it is determined whether or not the panning switch has been pressed for lateral rotation of the taking lens barrel 602, to cause input of a remote control signal giving an instruction for lateral rotation.

If the remote control signal for instructing lateral rotation has been input, the process proceeds to a step S212, wherein it is determined whether or not the remote control signal gives an instruction for counterclockwise rotation. If the instruction for counterclockwise rotation has been given, the process proceeds to a step S213, whereas if not, it is judged that an instruction for clockwise rotation has been given, and the process proceeds to a step S214. In the step S213 or S214, the lateral-rotation stepper motor 718a is rotated counterclockwise or clockwise by a predetermined number of steps. As a consequence, when the lateral-rotation stepper motor 718a is rotated counterclockwise, the taking lens barrel 602 is turned by a predetermined amount to be directed leftward, while when the lateral-rotation stepper motor 718a is rotated clockwise, the taking lens barrel 602 is turned by a predetermined amount to be directed rightward. Thereafter, the process returns to the step S204, wherein it is determined whether or not a remote control signal has been received.

When the photographer presses the tilting switch to cause vertical rotation of the taking lens barrel 602 (step S208), the process proceeds to a step S209, wherein it is determined whether or not the input remote control signal gives an instruction for upward rotation. If the instruction for upward rotation has been given, the process proceeds to a step S210, wherein the vertical-rotation stepper motor 718b is rotated in the normal direction by a predetermined number of steps. As a consequence, the taking lens barrel 602 is turned by a predetermined amount to be directed upward. If an instruction for downward rotation has been given, the process proceeds to a step S211, wherein the vertical-rotation stepper motor 718b is rotated in the reverse direction by a predetermined number of steps. As a consequence, the taking lens barrel 602 is turned by a predetermined amount to be directed downward. Thereafter, the process returns to the step S204, wherein it is determined whether or not another remote control signal has been received.

After repetition of the above described operations, if it is determined in the step S205 that a shooting signal has been received from the remote control 723, the process proceeds to a step S215, wherein it is determined whether or not the shooting signal is for moving image shooting. If the shooting signal is for moving image shooting, the process proceeds to a step S206, wherein recording of moving images is performed by video shooting. If the shooting signal is not for moving image shooting, it is judged that the shooting signal is for still image shooting, so that the process proceeds to a step S216, wherein it is determined whether or not the object is dark and whether or not the electronic flash 602g is to be used. If use of the electronic flash 602g is not required, still image shooting is performed in a step S218. If use of the electronic flash 602g is required, the electronic flash 602g is charged in a step S217, whereafter still image shooting is performed in the step S218. At this time, a trigger signal for flash illumination is issued by a known system in proper timing for shooting, and flash shooting is executed.

After completion of the moving image recording by video shooting in the step S206 or the still image shooting in the step S218, the steps S207 et seq. are executed.

The present embodiment provides the following advantageous effects.

(1) According to the present embodiment, rotation of the taking lens barrel 602 for an automated panning or tilting operation does not require a large hemispherical space as in the prior art, but requires only a thin cylindrical space, which makes it possible to realize a compact photographing apparatus provided with convenient portability.

(2) In relatively short distance shooting, the direction of the visual field and magnification of the taking lens barrel 602 can be freely controlled by the dedicated remote control 723. For example, in a situation like a home party, when the photographer carries the camera remote control 723 dedicated to the video camera of the present embodiment, and causes an instruction for panning or tilting to be issued from the remote control 723 while viewing the liquid crystal panel 601b of the video camera placed on a properly selected place e.g. in the shooting mode shown in FIG. 21B, the video camera operates the lateral-rotation stepper motor 718a or the vertical-rotation stepper motor 718b via the communication unit 712 to laterally pan or vertically tilt the taking lens barrel 602 according to the instruction. Thus, a free photographic composition or a photographic composition following the movement of the photographer can be easily set, which makes it possible to realize a user-friendly video camera which frees the photographer from the trouble of shooting motion and allows himself/herself to enter the field, for example, and participate in an image.

(3) In long distance shooting, a photographic composition and magnification of an object including a photographer can be easily changed, as desired, while checking the photographic composition of the video camera through the screen of the cellular phone 722, which makes it possible to construct an agreeable camera system which frees the photographer from the trouble of shooting motion. Further, the photographer or user can set the video camera of the present embodiment in a properly selected place, e.g. in the shooting mode shown in FIG. 22B, and freely monitor the inside of the user's house through the screen of the cellular phone 722 or the screen of a personal computer where the user is away from the house.

(4) It is also possible to recognize a main object e.g. by an object recognition technique and pan and/or tilt the photographic optical axis of the taking lens barrel 602 such that the main object is always brought into a specific position in a shot picture.

(5) In a shooting mode in which shooting is performed while viewing the liquid crystal panel 601b as shown in FIG. 21A or FIG. 21B, the liquid crystal panel 601b can be used in a vertically tilted state, and this function can be realized with a construction simpler than that of a display panel of a conventional video camera, which is supported by a two-way pivot. This is because the rear surface of the video camera body 601 is formed by the display panel 601b as a screen in the present embodiment, which largely contributes to reduction of the size and manufacturing costs of the camera.

Although in each of the above described embodiments, the present invention is applied to a video camera by way of example, this is not limitative, but the photographing apparatus of the present invention, which can be downsized, is also applicable to digital still cameras that perform moving image shooting or panning shot of still images, surveillance cameras, Web cameras, cellular phones, and so forth.

The present invention is not limited to the above described embodiments, but can be modified in various manners based on the subject matter of the present invention, which should not be excluded from within the scope of the present invention insofar as functions as recited in the appended claims or the functions performed by the construction of either of the above described embodiments can be achieved. Further, the present invention may either be applied to a system composed of a plurality of apparatuses or to a single apparatus.

Further, it is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A photographing apparatus comprising:
   an image pickup device that outputs an electric signal in response to object light;
   a photographic optical system that has a plurality of lenses, including a main lens group and a front lens, and a reflective surface disposed between the front lens and the main lens group and guides the object light to said image pickup device; and
   a shooting direction-changing device that pivots the reflective surface and the front lens together about a common axis relative to the main lens group to thereby change a shooting direction.

2. A photographing apparatus as claimed in claim 1, wherein said shooting direction-changing device pivots the front lens and the reflective surface at different rates by a predetermined ratio.

3. A photographing apparatus as claimed in claim 2, wherein the predetermined ratio is 2 to 1 so that the front lens pivots twice the amount of pivoting of the reflective surface.

4. A photographing apparatus as claimed in claim 1, comprising an illuminating device that illuminates an object in a direction from which the object light enters said photographic optical system.

5. A photographing apparatus as claimed in claim 1, wherein the reflective surface is a mirror.

6. A photographing apparatus as claimed in claim 1, wherein said shooting direction-changing device comprises:
  a lens driving device that pivots the front lens;
  a reflective surface-driving device that pivots the reflective surface; and
  a drive control device that drivingly controls said lens driving device and said reflective surface-driving device to pivot the front lens and the reflective surface about the axis at different rates.

7. A photographing apparatus as claimed in claim 6, wherein the front lens pivots twice the pivoting rate of the reflective surface.

8. A photographing apparatus comprising:
  an image pickup device that outputs an electric signal in response to object light;
  a photographic optical system that has a plurality of lenses and a reflective surface disposed therebetween and guides the object light to said image pickup device; and
  a shooting direction-changing device that causes the reflective surface and a predetermined lens or a predetermined lens group of said lenses to be pivotally moved in unison about respective different axes to thereby change a shooting direction,
  wherein said predetermined lens or said predetermined lens group is pivotally disposed on a side of the reflective surface closer to an object, and
  wherein said shooting direction-changing device causes said predetermined lens or said predetermined lens group to be pivotally moved by an amount twice as large as an amount of pivotal movement of the reflective surface.

9. A photographing apparatus comprising:
  an image pickup device that outputs an electric signal in response to object light;
  a photographic optical system that has a plurality of lenses and a reflective surface disposed therebetween and guides the object light to said image pickup device; and
  a shooting direction-changing device that causes the reflective surface and a predetermined lens or a predetermined lens group of said lenses to be pivotally moved in unison about respective different axes to thereby change a shooting direction,
  wherein said shooting direction-changing device comprises:
  a lens driving device that is provided in association with said predetermined lens or said predetermined lens group, for pivotally moving said predetermined lens or said predetermined lens group;
  a reflective surface-driving device that is provided in association with the reflective surface, for pivotally moving the reflective surface; and
  a drive control device that drivingly controls said lens driving device and said reflective surface-driving device to be pivotally moved in unison,
  wherein said predetermined lens or said predetermined lens group is pivotally disposed on a side of the reflective surface closer to an object, and
  wherein said drive control device drivingly controls said lens driving device and said reflective surface-driving device in a manner such that said predetermined lens or said predetermined lens group is pivotally moved by an amount twice as large as an amount of pivotal movement of the reflective surface.

10. A photographing apparatus comprising:
  an image pickup device that outputs an electric signal in response to object light;
  a photographic optical system that has a plurality of lenses and a reflective surface disposed therebetween and guides the object light to said image pickup device; and
  a shooting direction-changing device that causes the reflective surface and a predetermined lens or a predetermined lens group of said lenses to be pivotally moved in unison about respective different axes to thereby change a shooting direction,
  wherein said shooting direction-changing device reduces a rotational speed of pivotal movement of one of the reflective surface or said predetermined lens or said predetermined lens group, said one moving in a larger amount than other of the reflective surface or said predetermined lens or said predetermined lens group, to thereby cause the pivotal movement reduced in the rotational speed to be transmitted to the other of the reflective surface or said predetermined lens or said predetermined lens group.

11. A photographing apparatus comprising:
  a first scanning device that scans a photographic optical system in a first direction on a plane orthogonal to a photographic optical axis of the photographic optical system;
  a second scanning device that scans said photographic optical system in a second direction different from the first direction;
  a posture detecting device that detects a posture of the photographic optical system about the photographic optical axis thereof; and
  a drive control device that causes said first and second scanning devices to cooperatively operate based on a posture detecting signal from said posture detecting device.

12. A photographing apparatus as claimed in claim 11, wherein:
  the photographic optical system has an image pickup surface;
  the photographing apparatus further comprises a third scanning device that pivotally moves the image pickup surface of the photographic optical system about the photographic optical axis; and
  said drive control device causes said first, second, and third scanning devices to cooperatively operate based on a posture detecting signal from the posture detecting device.

13. A photographing apparatus comprising:
  an optical system;
  a locus recording device that records locus information indicative of a locus of a shooting direction;
  a shooting direction-changing device that scans said optical system to change the shooting direction; and
  a shooting direction-returning device that drivingly controls said shooting direction-changing device based on the locus information recorded in said locus recording device, to thereby return the shooting direction to an initial position thereof.

14. A photographing apparatus as claimed in claim 13, further comprising an information reset device that resets the locus information recorded in the locus recording device, when the shooting direction is returned to the initial position thereof.

15. A photographing apparatus comprising:
an optical system comprising a main optical section that is formed by a plurality of lenses arranged along a photographic optical axis, an angling optical section that has a reflective surface for angling the photographic optical axis, and an image pickup section that forms an image from an optical flux from said main optical section, the main optical section, the angling optical section, and the image pickup section being rotatable together in unison about the photographic optical axis;
a first turning device that rotates said main optical section and said angling optical section in unison about the photographic optical axis;
a second turning device that rotates said image pickup section about the photographic optical axis; and
a drive control device that drivingly controls said first and second turning devices in an interlocked manner.

16. A photographing apparatus comprising:
an optical system comprising a main optical section that is formed by a plurality of lenses arranged along a photographic optical axis, an angling optical section that has a reflective surface for angling the photographic optical axis, and an image pickup section that forms an image from an optical flux from said main optical section, said main optical section and said angling optical section being rotatable relative to each other about the photographic optical axis, and said image pickup section being rotatable about the photographic optical axis;
an optical section-turning device that rotates said bending optical section relative to said main optical section about the photographic optical axis;
an image pickup section-turning device that rotates said image pickup section about the photographic optical axis; and
a drive control device that drivingly controls said optical section-turning device and said image pickup section in an interlocked manner.

17. A method of controlling a photographing apparatus including a photographic optical system having a plurality of lenses, including a main lens group and a front lens, and a reflective surface disposed between the front lens and the main lens group, the method comprising the steps of:

mounting the front lens and the reflective surface about a common axis so that the front lens and the reflective surface are pivotable together relative to the main lens group to change a shooting direction;
pivoting both the front lens and the reflective surface relative to the main lens group.

18. A method of controlling a photographing apparatus according to claim 17, wherein the front lens and the reflective surface are pivoted at different rates.

19. A method of controlling a photographing apparatus according to claim 18, wherein the front lens pivots twice the pivoting rate of the reflective surface.

20. A method of controlling a photographing apparatus including a first scanning device that scans a photographic optical system in a first direction on a plane orthogonal to a photographic optical axis of the photographic optical system, a second scanning device that scans the photographic optical system in a second direction different from the first direction, and a posture detecting device that detects a posture of the photographic optical system about the photographic optical axis, the method comprising:
a drive control step of causing the first and second scanning devices to cooperatively operate based on a posture detecting signal from the posture detecting device.

21. A method of controlling a photographing apparatus including a locus recording device that records locus information indicative of a locus of a shooting direction, and a shooting direction-changing device that scans the optical system to change the shooting direction, the method comprising:
a shooting direction-returning step of drivingly controlling the shooting direction-changing device based on the locus information recorded in the locus recording device, to thereby return the shooting direction to an initial position thereof.

22. A method of controlling a photographing apparatus having an optical system comprising a main optical section that is formed by a plurality of lenses arranged along a photographic optical axis, and is rotatable about the photographic optical axis, an angling optical section that has a reflective surface for angling the photographic optical axis and is rotatable about the photographic optical axis, and an image pickup section that forms an image from an optical flux from the main optical section and is rotatable about the photographic optical axis, the method comprising:
a drive control step of drivingly controlling a first turning device that rotates the main optical section and the angling optical section in unison about the photographic optical axis and a second turning device that rotates the image pickup section about the photographic optical axis, in an interlocked manner.

* * * * *

UNITED STATES PATENT AND TRADEMARK OFFICE
CERTIFICATE OF CORRECTION

PATENT NO. : 7,465,107 B2
APPLICATION NO. : 11/231525
DATED : December 16, 2008
INVENTOR(S) : Koichi Washisu et al.

It is certified that error appears in the above-identified patent and that said Letters Patent is hereby corrected as shown below:

Col. 31 In claim 16, line 38, amend as follows:

DELETE:     the word "bending"

INSERT:     the word --angling--

Signed and Sealed this

Tenth Day of February, 2009

JOHN DOLL
*Acting Director of the United States Patent and Trademark Office*